(12) United States Patent
Yuzawa et al.

(10) Patent No.: US 10,250,901 B2
(45) Date of Patent: Apr. 2, 2019

(54) TRANSMITTING/RECEIVING DEVICE, METHOD, AND CODING/DECODING DEVICE

(71) Applicant: SATURN LICENSING LLC, New York, NY (US)

(72) Inventors: Keiji Yuzawa, Saitama (JP); Teruhiko Suzuki, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 410 days.

(21) Appl. No.: 14/399,282

(22) PCT Filed: Jun. 21, 2013

(86) PCT No.: PCT/JP2013/067147
§ 371 (c)(1),
(2) Date: Nov. 6, 2014

(87) PCT Pub. No.: WO2014/002914
PCT Pub. Date: Jan. 3, 2014

(65) Prior Publication Data
US 2015/0124884 A1    May 7, 2015

(30) Foreign Application Priority Data

Jun. 28, 2012 (JP) .................................. 2012-144979

(51) Int. Cl.
*H04N 19/52* (2014.01)
*H04N 19/70* (2014.01)
(Continued)

(52) U.S. Cl.
CPC ............. *H04N 19/52* (2014.11); *H04N 19/30* (2014.11); *H04N 19/31* (2014.11); *H04N 19/70* (2014.11)

(58) Field of Classification Search
CPC ........ H04N 19/30; H04N 19/31; H04N 19/52; H04N 19/70
See application file for complete search history.

(56) References Cited

U.S. PATENT DOCUMENTS

2005/0169379 A1    8/2005  Shin et al.
2007/0200923 A1    8/2007  Eleftheriadis et al.
(Continued)

FOREIGN PATENT DOCUMENTS

CN    101507281 A    8/2009
CN    101924944 A    12/2010
(Continued)

OTHER PUBLICATIONS

Wang et al. ("System and Transport Interface of SVC," in IEEE Transactions on Circuits and Systems for Video Technology, vol. 17, No. 9, pp. 1149-1163, Sep. 2007. doi: 10.1109/TCSVT.2007.906827).*

(Continued)

*Primary Examiner* — Maria E Vazquez Colon
(74) *Attorney, Agent, or Firm* — Oblon, McClelland, Maier & Neustadt, L.L.P.

(57) ABSTRACT

Provided is a transmitting device including a hierarchical classification section that classifies image data of each picture constituting moving image data into a plurality of layers, an image coding section that codes the classified image data of each layer, and generates a video stream holding the coded image data of each layer, and a transmitting section that transmits a container in a prescribed format that includes the generated video stream. The image coding section performs coding so that a referenced picture belongs to a layer of referencing image data and/or a layer lower than the layer of the referencing image data.

15 Claims, 23 Drawing Sheets

(51) Int. Cl.
  *H04N 19/31* (2014.01)
  *H04N 19/30* (2014.01)

(56) References Cited

U.S. PATENT DOCUMENTS

| | | | |
|---|---|---|---|
| 2007/0230566 | A1 | 10/2007 | Eleftheriadis et al. |
| 2009/0031021 | A1* | 1/2009 | Bae ................ H04N 21/234318 709/224 |
| 2009/0041129 | A1* | 2/2009 | Suh ........................ H04H 20/55 375/240.25 |
| 2010/0142625 | A1* | 6/2010 | Lee ................ H04N 21/234327 375/240.26 |
| 2010/0158134 | A1 | 6/2010 | Yin et al. |
| 2012/0183076 | A1* | 7/2012 | Boyce ................. H04N 19/105 375/240.25 |

FOREIGN PATENT DOCUMENTS

| | | |
|---|---|---|
| JP | 2007-520149 A | 7/2007 |
| JP | 2009-510952 A | 3/2009 |
| JP | 2009510952 A | 3/2009 |
| JP | 2009-540629 A | 11/2009 |
| JP | 2010-507346 A | 3/2010 |
| JP | 2010507346 | 3/2010 |
| RU | 2377737 C2 | 12/2009 |
| RU | 2395174 C1 | 7/2010 |
| WO | WO 2007/038807 A2 | 4/2007 |

OTHER PUBLICATIONS

Extended European Search Report dated Feb. 12, 2016 in Patent Application No. 13808997.4.

Ye-Kui Wang, et al., "System and Transport Interface of SVC" IEEE Transactions on Circuits and Systems for Video Technology, vol. 17, No. 9, XP011193022, Sep. 2007, pp. 1149-1163.

Manu Mathew "Overview of Temporal Scalability With Scalable Video Coding (SVC)" Texas Instruments Incorporated, Application Report SPRABG3, XP055247403, Nov. 2010, 8 Pages.

Jill Boyce, et al., "High level syntax hooks for future extensions" Vidyo, Qualcomm, Joint Collaborative Team on Video Coding (JCT-VC) of ITU-T SG16 WP3 and ISO/IEC JTC1/SC29/WG11, Document: JCTVC-H0388, XP030051788, Feb. 2012, pp. 1-8.

Rickard Sjöberg, et al., "Overview of HEVC high-level syntax and reference picture management" IEEE Transactions on Circuits and Systems for Video Technology, XP055045360, Jan. 2012, pp. 1-14.

Thomas Rusert, et al., "High level syntax for scalability support in HEVC" Ericsson, Joint Collaborative Team on Video Coding (JCT-VC) of ITU-T SG16 WP3 and ISO/IEC JTC1/SC29/WG11, Document: JCTVC-F491, WG11 No. M20921, XP030049484, Jul. 2011, pp. 1-9.

Thomas Schierl, et al., "System Layer Integration of High Efficiency Video Coding" IEEE Transactions on Circuits and Systems for Video Technology, vol. 22, No. 12, XP011487157, Dec. 2012, pp. 1871-1884.

"Advanced Video Coding for Generic Audiovisual Services", Series H: Audiovisual and Multimedia Systems Infrastructure of audiovisual services—Coding of moving video, ITU-T, H.264, Jun. 2011, 686 pages.

Combined Office Action and Search Report dated Apr. 18, 2017 in Chinese Patent Application No. 201380032438.1 (with English translation).

Russian Office Action dated May 24, 2017 in Russian patent application No. 2014151717 with English translation, 18 pages.

Japanese Office Action dated May 2, 2017 in Japanese patent application No. 2014-522604, 7 pages, (with English translation).

Chinese Second Office Action dated Aug. 18, 2017 in Chinese Application No. 201380032438.1 with English translation, 28 pages.

Guang Liu et al., "Research in Rate Control Technique for Scalable Video Coding", Oct. 2010, vol. 20, No. 10, (English abstract), 4 pages.

ITU-T, H.264 (Jan. 2012), Telecommunication Standardization Sector of ITU, Series H: Audiovisual and Multimedia Systems—Infrastructure of audiovisual services—Coding of moving video, Advanced vide coding for generic audiovisual services, Recommendation ITU-T H.264, 26 pages.

\* cited by examiner

FIG. 6

```
fps_descriptor
    descriptor_tag      (0xf0)
    descriptor_length   (0x02)
    base                (0x1e)
    max                 (0x03)
```

FIG. 14

```
structure_descriptor
    descriptor_tag     (0xf1)
    descriptor_length  (0x--)
    base               (0x1e)
    max                (0x03)
    for(i=0; i<N; i++){
        layer_PID
    }
```

FIG. 15

(a)
```
structure_descriptor
    descriptor_tag    (0xf3)
    descriptor_length (0x--)
    for(i=0; i<N; i++){
        layer_PID
    }
```

(b)
```
fps_info(payloadSize)
    base              (0x1e)
    max               (0x03)
```

TRANSMITTING/RECEIVING DEVICE, METHOD, AND CODING/DECODING DEVICE

TECHNICAL FIELD

The present technology relates to a transmitting device, a transmitting method, a coding device, a receiving device, a receiving method, and a decoding device, and more particularly, to a transmitting device and the like enabling a high frame frequency service.

BACKGROUND ART

When providing compressed moving images over broadcasting or network services and the like, the upper limit of the frame frequency that may be played back is restricted by the performance of the receiver. Consequently, the service side is required to take the playback performance of prevalent receivers into account, and restrict the service to low frame frequency only, or simultaneously provide multiple high-grade and low-grade services.

Adding support for high frame frequency services increases the cost of the receiver, and becomes a barrier to adoption. If only low-cost receivers dedicated to low frame frequency services are widespread, and in the future the service side starts a high frame frequency service, the new service is completely unwatchable without a new receiver, which becomes a barrier to adoption of the service.

Moving image compression schemes such as H.264/AVC (Advanced Video Coding) (see Non-Patent Literature 1) are generally made up of the following three types of pictures.

I picture: decodable by itself

P picture: decodable by itself with reference to an I picture or another P picture B picture: decodable by itself with reference to an I picture, a P picture, or another B picture Utilizing this property, frame-decimated playback is possible to some extent, such as by playing only I pictures and P pictures, for example. However, with this method, finely decimated playback is difficult, and usage as a practical service is challenging.

CITATION LIST

Non-Patent Literature

Non-Patent Literature 1: ITU-T H.264 (June 2011), "Advanced video coding for generic audiovisual services."

SUMMARY OF INVENTION

Technical Problem

An objective of the present technology is to achieve with ease a high frame frequency service.

Solution to Problem

According to an aspect of the present technology, there is provided a transmitting device including a hierarchical classification section that classifies image data of each picture constituting moving image data into a plurality of layers, an image coding section that codes the classified image data of each layer, and generates a video stream holding the coded image data of each layer, and a transmitting section that transmits a container in a prescribed format that includes the generated video stream. The image coding section performs coding so that a referenced picture belongs to a layer of referencing image data and/or a layer lower than the layer of the referencing image data.

In the present technology, the image data of each picture constituting moving image data is classified into multiple layers by a hierarchical classification section. The image data of each layer is coded by an image coding section, and a video stream holding the coded image data of each layer is generated. In this case, image data is coded so that a referenced picture belongs to a layer of referencing image data and/or a lower layer than the layer of the referencing image data.

A container in a prescribed format that includes the above video stream is transmitted by a transmitting section. For example, the container may be the transport stream (MPEG-2 TS) adopted in digital broadcasting standards. As another example, the container may be MP4 used in Internet delivery and the like, or a container in some other format.

In this way, in the present technology, the image data of each picture constituting moving image data is classified into a plurality of layers, and a video stream holding the coded image data of each layer is transmitted. For this reason, by simply transmitting one program or one file, a service supporting various frame frequencies may be provided, and a reduction in operating costs becomes possible.

Also, on the receiving side, the coded image data in a prescribed layer and lower layers may be selectively retrieved and decoded, enabling playback at a frame frequency suited to the playback performance of the receiving side itself, thereby effectively promoting the adoption of receivers. Herein, image data is coded so that a referenced picture belongs to the layer of the referencing image data and/or a lower layer than a layer of referencing image data, and at a receiver, the playback performance of the receiver itself may be used effectively without needing to decode layers higher than the prescribed layer.

Note that in the present technology, for example, the image coding section may be configured to generate a single video stream holding the coded image data of each layer, and for each picture, add layer identification information for identifying the layer containing the picture to the coded image data of each layer. In this case, on the receiving side, it is possible to conduct good selective retrieval of coded image data in a prescribed layer and lower layers, on the basis of the layer identification information.

Also, in the present technology, for example, the hierarchical classification section may be configured to classify the image data of each picture constituting the moving image data into a plurality of layers so that, except for the lowest layer, the pictures belonging to each layer are equal in number to the pictures belonging to all lower layers, and in addition, are positioned in the temporal center between the pictures belonging to all lower layers. In this case, the frame frequency doubles every time the layer is raised by one, and thus on the receiving side, it becomes possible to easily recognize the frame frequency in each layer with only the frame frequency information of the pictures in the lowest layer.

Also, the present technology may be configured to additionally include an information inserting section that inserts, into the container, frame frequency information of pictures in a lowest layer and layer number information indicating the number of the plurality of layers. For example, it may be configured so that the information is inserted into a container layer or a video layer. In this case, on the receiving side, it becomes possible to easily acquire the frame frequency information of the pictures in the lowest layer and the layer number information indicating the number of the plurality of layers.

Also, in the present technology, for example, the information inserting section may be configured so that, when inserting the information into the video layer, the information inserting section additionally inserts, into the container layer, identification information that identifies whether or not an insertion of the information into the video layer exists. In this case, on the receiving side, it becomes possible to know whether or not frame frequency information of the pictures in the lowest layer and layer number information indicating the number of the plurality of layers is inserted into the video stream, without decoding the video stream.

Also, the present technology may be configured to generate a plurality of video streams holding the coded image data for each layer, for example. In this case, for example, the present technology may be configured to additionally include an identification information inserting section that inserts stream identification information for identifying the video stream of each layer into the container layer. In this case, on the receiving side, it is possible to conduct good selective retrieval of coded image data in a prescribed layer and lower layers, on the basis of the stream identification information.

According to another aspect of the present technology, there is provided a receiving device including a receiving section that receives a container in a prescribed format that includes a video stream holding image data of each picture constituting moving image data, the image data being classified into a plurality of layers and coded so that a referenced picture belongs to a layer of referencing image data and/or a layer lower than the layer of the referencing image data, an image decoding section that selectively retrieves and decodes coded image data of a prescribed layer and lower layers from the video stream included in the received container, and obtains image data of each picture, and a playback speed adjustment section that adjusts a speed of image playback according to the decoded image data of each picture to a frame frequency of pictures in the prescribed layer.

In the present technology, a container in a prescribed format is received by a receiving section. The container includes a video stream holding image data of each picture constituting moving image data, the image data being classified into a plurality of layers and coded so that a referenced picture belongs to a layer of referencing image data and/or a lower layer than the layer of the referencing image data. For example, the container may be the transport stream (MPEG-2 TS) adopted in digital broadcasting standards. As another example, the container may be MP4 used in Internet delivery and the like, or a container in some other format.

The coded image data in a prescribed layer and lower layers is selectively retrieved and decoded from the video stream included in the container by an image decoding section, and the image data of each picture is obtained. Subsequently, the speed of image playback according to the decoded image data of each picture is adjusted by a playback speed adjustment section, so as to match the frame frequency of the pictures in the prescribed layer.

For example, the present technology may be configured so that frame frequency information of pictures in a lowest layer and layer number information indicating the number of the plurality of layers are inserted into the container, and the present technology may additionally include a control section that, on the basis of the information inserted into the container and the decoding performance of the receiving device itself, controls a decoding layer in the image decoding section, and controls the image playback speed in the playback speed adjustment section.

In this way, in the present technology, the coded image data in a prescribed layer and lower layers may be selectively retrieved and decoded, enabling playback at a frame frequency suited to the playback performance of the receiving device itself. Also, image data is coded so that a referenced picture belongs to a layer of referencing image data and/or a lower layer than the layer of the referencing image data, and the playback performance of the receiving device itself may be used effectively without needing to decode layers higher than the prescribed layer.

Note that the present technology may be configured so that, for example, a single video stream holding the coded image data of each layer is included in the container, and for each picture, layer identification information for identifying the layer containing the picture is added to the coded image data of each layer. The image decoding section selectively retrieves and decodes coded image data in the prescribed layer and lower layers from the single video stream on the basis of the layer identification information. In this case, even if the container includes a single video stream holding the coded image data of each layer, good selective retrieval of the coded image data in the prescribed layer and lower layers may be conducted.

Also, the present technology may be configured so that, for example, a plurality of video streams holding the coded image data for each of the plurality of layers is included in the container, and stream identification information for identifying the video stream of each layer is inserted into the container layer. The image coding section selectively retrieves and decodes coded image data from the video streams of a prescribed layer and lower layers on the basis of the stream identification information. In this case, even if the container includes a plurality of video streams holding the coded image data of each layer, good selective retrieval of the coded image data in the prescribed layer and lower layers may be conducted.

Advantageous Effects of Invention

According to the present technology, it is possible to easily achieve a high frame frequency service.

BRIEF DESCRIPTION OF DRAWINGS

FIG. 6 is a diagram illustrating example syntax of an FPS descriptor.

FIG. 14 is a diagram illustrating example syntax of a structure descriptor (structure_descriptor) placed under a PMT.

FIG. 15 is a diagram illustrating an example of using an FPS info (fps_info) SEI message in the case of generating multiple video streams having image data in each of the multiple layers during image coding.

DESCRIPTION OF EMBODIMENTS

Hereinafter, embodiments for carrying out the invention (hereinafter designated the exemplary embodiments) will be described. Hereinafter, the description will proceed in the following order.

1. Exemplary embodiments
2. Exemplary modifications

1. Exemplary Embodiments

TV Transmitting/Receiving System

Figure 1:
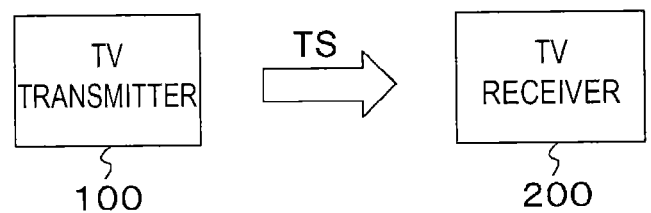
FIG. 1 is a block diagram illustrating an exemplary configuration of a TV transmitting/receiving system as an exemplary embodiment.

FIG. 1 illustrates an exemplary configuration of a television (TV) transmitting/receiving system 10 as an exemplary embodiment. The TV transmitting/receiving system 10 includes a TV transmitter 100 and a TV receiver 200.

The TV transmitter 100 transmits a transport stream TS that acts as a container on a carrier wave. In the transport stream TS, the image data of each picture constituting moving image data is classified into multiple layers, and the transport stream TS includes a single video stream holding the coded data of the image data in each layers. In this case, coding such as H.264/AVC is performed, for example, so that a referenced picture belongs to a layer of referencing image data and/or a lower layer than the layer of the referencing image data.

In this case, the image data of each picture constituting the moving image data is classified into multiple layers so that, except for the lowest layer, the pictures belonging to each layer are equal in number to the pictures belonging to all lower layers, and in addition, are positioned in the temporal centers between the pictures belonging to all lower layers. With such a classification, the frame frequency doubles every time the layer is raised by one, and thus on the receiving side, it becomes possible to easily recognize the frame frequency in each layer with only the frame frequency information of the pictures in the lowest layer.

For each picture, layer identification information for identifying the containing layer is added to the coded image data of each layer. In this exemplary embodiment, layer identification information (temporal_id) is placed in the header part of the NAL unit (nal_unit) of each picture. As a result of layer identification information being added in this way, on the receiving side, it is possible to conduct good selective retrieval of coded image data in a prescribed layer and lower layers.

Frame frequency information of the pictures in the lowest layer and layer number information indicating the number of the multiple layers is inserted into the transport stream TS. This information is inserted into the transport layer or the video layer. For example, this information is inserted into statements under a video elementary loop under a program map table (PMT). As another example, this information is inserted as an SEI message in the "SEIs" part of an access unit. As a result of frame frequency information and layer number information being inserted in this way, on the receiving side, it becomes possible to acquire this information easily.

The TV receiver 200 receives the above transport stream TS sent from the TV transmitter 100 on a carrier wave. The TV receiver 200 selectively retrieves and decodes the coded image data of a prescribed layer and lower layers from the video stream included in the transport stream TS, acquires the image data of each picture, and conducts image playback. In this case, the speed of image playback according to the decoded image data of each picture is adjusted to match the frame frequency of the pictures in the prescribed layer.

As discussed earlier, frame frequency information of the pictures in the lowest layer and layer number information indicating the number of the multiple layers is inserted into the transport stream TS. At the TV receiver 200, the decoding layer is controlled on the basis of this information and the decoding performance of the TV receiver 200 itself, and in addition, the image playback speed is controlled.

[Exemplary Configuration of TV Transmitter]

Figure 2:
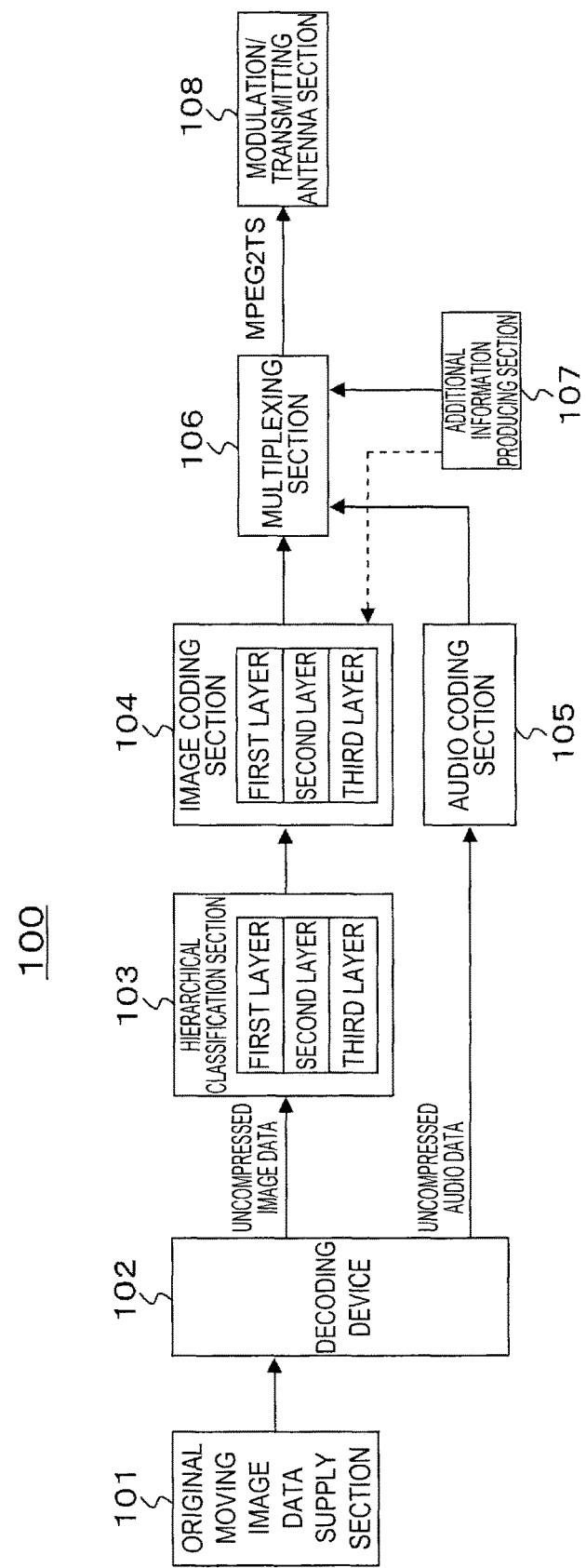
FIG. 2 is a block diagram illustrating an exemplary configuration of TV transmitter constituting a TV transmitting/receiving system.

FIG. 2 illustrates an exemplary configuration of the TV transmitter 100. The TV transmitter 100 includes an original moving image data supply section 101, a decoding device 102, a hierarchical classification section 103, an image coding section 104, an audio coding section 105, a multiplexing section 106, an additional information producing section 107, and a modulation/transmitting antenna section 108.

The original moving image data supply section 101 retrieves original moving image data (image data, audio data) stored in an appropriate professional compression format on a device such as a hard disk drive (HDD), and supplies the retrieved original moving image data to the decoding device 102. The decoding device 102 decodes the original moving image data, and outputs uncompressed image data and uncompressed audio data.

The hierarchical classification section 103 classifies the image data of each picture constituting the uncompressed image data into multiple layers. For example, as illustrated in the drawing, image data is classified into the three layers of a first layer, a second layer, and a third layer. Herein, the hierarchical classification section 103 conducts classification so that, except for the lowest layer, the pictures belonging to each layer are equal in number to the pictures belonging to all lower layers, and in addition, are positioned in the temporal center between the pictures belonging to all lower layers.

The image coding section 104 encodes the classified image data of each layer, and generates a video stream (video elementary stream) holding the coded image data of each layer. Herein, the image coding section 104 conducts coding such as H.264/AVC, for example, so that a referenced picture belongs to a layer of referencing image data and/or a lower layer than the layer of the referencing image data.

Figure 3:
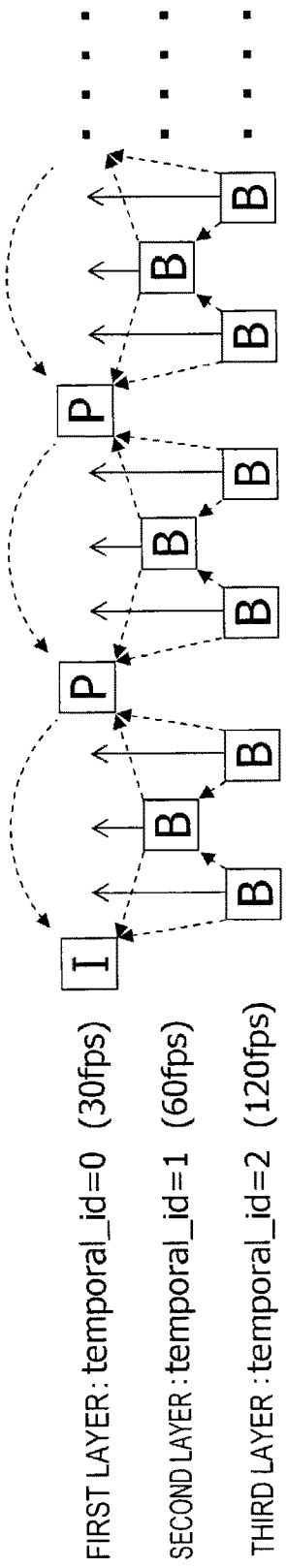
FIG. 3 is a diagram illustrating an example of hierarchical classification and image coding.

FIG. 3 illustrates an example of hierarchical classification and image coding. This example is an example of classifying the image data of each picture into three layers from a first layer to a third layer. In this example, I pictures (intra pictures) and P pictures (predictive pictures) are made to belong to the first layer. An I picture does not reference another picture, while a P picture only references an I picture or a P picture. For this reason, the first layer is decodable with just first layer pictures.

In addition, B pictures (bi-directional predictive pictures) are placed in the temporal center positions between the respective pictures in the first layer, and are made to belong to the second layer. The B pictures in the second layer are encoded so as to reference only pictures belonging to a combined layer of the second layer and/or the first layer.

In this example, B pictures in the second layer are made to reference only I pictures and P pictures in the first layer. For this reason, the second layer is decodable with just the first/second combined layer. Also, compared to the case of decoding the first layer only, the frame frequency is doubled when decoding the first/second combined layer.

In addition, B pictures are placed in the temporal center positions between the respective pictures in the first/second combined layer, and are made to belong to the third layer. The B pictures in the third layer are made to reference only pictures belonging to the third layer and/or the first/second combined layer. For this reason, the third layer is decodable with just the first to third combined layer. Also, compared to the case of decoding the first/second combined layer only, the frame frequency is doubled when decoding the first to third combined layer.

In FIG. 3, the dashed lines indicate picture reference relationships. A P picture in the first layer references only the immediately previous I picture or P picture. A B picture in the second layer references only the immediately previous or immediately following I picture or P picture in the first layer. A B picture in the third layer references only the immediately previous or immediately following I picture, P picture, or B picture in the first/second combined layer.

For each picture, the image coding section 104 adds layer identification information for identifying the layer containing the picture to the coded image data of each layer. In other words, the image coding section 104 places layer identification information (temporal_id) in the header part of the NAL unit (nal_unit) of each picture.

Figure 4:
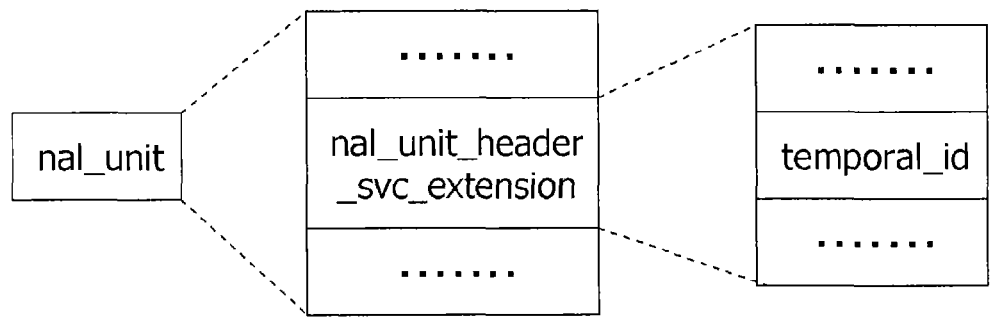
FIG. 4 is a diagram for explaining the placement position of hierarchical identification information (temporal_id).

FIG. 4 illustrates the placement position of the layer identification information (temporal_id). Namely, the layer identification information (temporal_id) is placed in the NAL unit header SVC extension (Header svc extension), for example. Additionally, as illustrated in FIG. 3, "temporal_id=0" is assigned to pictures belonging to the first layer, "temporal_id=1" is assigned to pictures belonging to the second layer, and "temporal_id=3" is assigned to pictures belonging to the third layer.

In the example of FIG. 3, when the frame frequency of the first layer only is 30 fps, the frame frequency of the first/second combined layer is 60 fps, and the frame frequency of the first to third combined layer is 120 fps. Also, although not illustrated in the drawing, it is possible to similarly construct a fourth layer and fifth layer.

Returning to FIG. 2, the audio coding section 105 performs coding such as MPEG-2 Audio or AAC on the uncompressed audio data, and generates an audio stream (audio elementary stream). The multiplexing section 106 multiplexes the elementary streams output from the video encoder 132 and the audio encoder 133. The multiplexing section 106 then outputs a transport stream TS as transport data.

Figure 5:
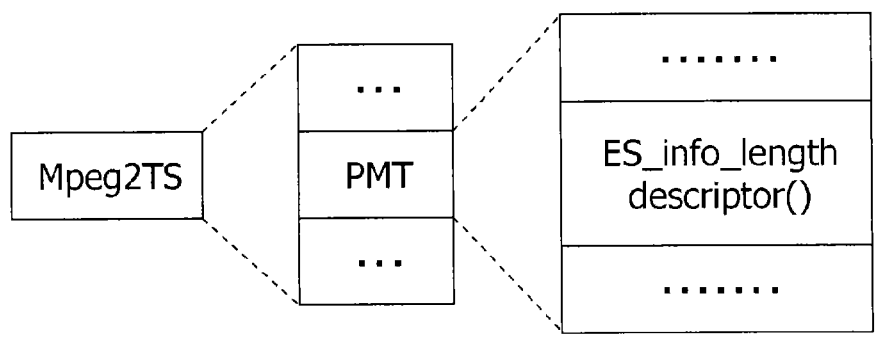
FIG. 5 is a diagram for explaining the placement position of an FPS descriptor (fps_descriptor).

The additional information producing section 107 produces, and sends to the multiplexing section 106, frame frequency information of the pictures in the lowest layer and layer number information indicating the number of the multiple layers. The multiplexing section 106 inserts this information into the transport layer. For example, in the descriptor loop under "ES_info_length" of a program map table (PMT), the multiplexing section 106 places a newly defined FPS descriptor (fps_descriptor) stating the frame frequency information and the layer number information, as illustrated in FIG. 5. This descriptor loop is the place that states the property information of each elementary stream (elementary_stream). The FPS descriptor is treated as one descriptor included among the above.

FIG. 6 illustrates example syntax of the FPS descriptor. The 8-bit field "descriptor_tag" indicates the class of the descriptor, and herein indicates that the descriptor is the FPS descriptor. For example, the currently unused "0xf0" is assigned. The 8-bit field "descriptor_length" indicates the immediately following byte length, and herein is "0x02".

The 8-bit field "base" expresses the frame frequency information of pictures in the lowest layer, or in other words the frame frequency information of the first layer. For example, in the case of 30 fps as in the example illustrated in FIG. 3, the value is "0x1e" indicating 30. The 8-bit field "max" expresses layer number information indicating the number of the multiple layers. For example, in the case of layers up to the third layer as in the example illustrated in FIG. 3, the value is "0x03" indicating 3.

In this way, by adding the FPS descriptor on the transmitting side (coding side), frame-decimated playback becomes easy on the receiving side (decoding side). In other words, it is known from the stated content of the FPS descriptor that the frame frequency is 30 fps with the first layer only, 60 fps with the first/second combined layer, and 120 fps with the first to third combined layer. For example, if the decoding performance on the receiving side goes up to a maximum of 60 fps, from this information it is known that up to the first/second combined layer is decodable. Additionally, it is known that it is sufficient to decode the pictures with "temporal_id=0" and "temporal_id=1". Also, it is known that it is sufficient to play back decoded pictures at 60 fps.

Figure 7:
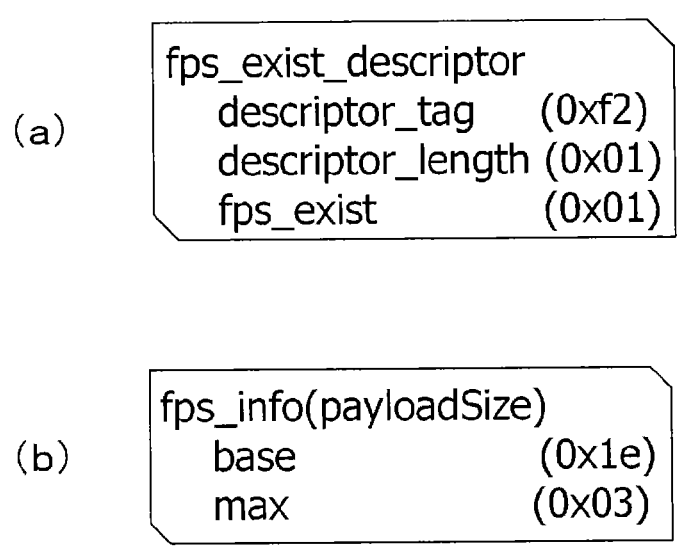
FIG. 7 is a diagram illustrating example syntax of FPS info (fps_info) inserted as an SEI message in the "SEIs" portion of an access unit, and example syntax of an FPS exist descriptor (fps_exit_descriptor) placed under a PMT.

Note that inserting the frame frequency information and the layer number information in the video layer, such as, for example, an SEI message in the "SEIs" part of an access unit, is also conceivable. In this case, the additional information producing section 107 transmits this information to the image coding section 104, as indicated by the dashed line. As illustrated in FIG. 7(b), the image coding section 104 inserts FPS info (fps_info) including the "base" and "max" information as an "fps_info SEI message" in the "SEIs" part of the access unit.

In the case of using an SEI message in this way, the multiplexing section 106 inserts identification information identifying the existence of that SEI message in the transport layer. For example, in the descriptor loop under "ES_info_length" of the program map table (PMT), the multiplexing section 106 places a newly defined FPS exist descriptor (fps_exit_descriptor), as illustrated in FIG. 7(a).

The 8-bit field "descriptor_tag" indicates the class of the descriptor, and herein indicates that the descriptor is the FPS exist descriptor. For example, the currently unused "0xf2" is assigned. The 8-bit field "descriptor_length" indicates the immediately following byte length, and herein is "0x01". The 8-bit field "fps_exit" indicates the existence of an SEI message with inserted FPS info (fps_info). For example, "fps_exit=0" indicates that the SEI message does not exist, whereas "fps_exit=1" indicates that the SEI message exists.

In this way, by adding the FPS exist descriptor on the transmitting side (coding side), the receiving side (decoding side) knows of the existence of an SEI message with inserted FPS info (fps_info) that includes the frame frequency information and the layer number information. If the FPS exist descriptor indicates the existence of an SEI message, the receiving side (decoding side) extracts fps_info, and is able to know, from the values of "base" and "max" inside, which pictures have the "temporal_id" that the receiving side (decoding side) itself should decode. On the basis thereof, the receiving side (decoding side) decodes pictures with the desired "temporal_id".

Returning to FIG. 2, the modulation/transmitting antenna section 108 modulates the transport stream TS according to a modulation scheme suited to broadcasting, such as QPSK/OFDM. The modulation/transmitting antenna section 108 then transmits an RF modulated signal from a transmitting antenna.

Operations of the TV transmitter 100 illustrated in FIG. 2 will be described. Original moving image data (image data, audio data) stored in an appropriate professional compression format is supplied from the original moving image data supply section 101 to the decoding device 102. In the decoding device 102, the original moving image data is decoded, and uncompressed image data and uncompressed audio data are obtained.

The uncompressed image data obtained by the decoding device 102 is supplied to the hierarchical classification section 103. In the hierarchical classification section 103, the image data of each picture constituting the uncompressed image data is classified into multiple layers. In this case, pictures are classified so that, except for the lowest layer, the pictures belonging to each layer are equal in number to the pictures belonging to all lower layers, and in addition, are positioned in the temporal center between the pictures belonging to all lower layers (see FIG. 3).

The image data of each layer hierarchically classified in this way is supplied to the image coding section 104. In the image coding section 104, the classified image data of each layer is decoded, and a video stream (video elementary stream) holding the coded image data of each layer is generated. In this case, coding such as H.264/AVC is conducted, so that a referenced picture belongs to a layer of referencing image data and/or a lower layer than the layer of the referencing image data.

In this case, in the image coding section 104, for each picture, layer identification information for identifying the layer containing the picture is added to the coded image data of each layer. In other words, in the image coding section 104, layer identification information (temporal_id) is placed in the header part of the NAL unit (nal_unit) of each picture (see FIG. 4).

In addition, the uncompressed audio data obtained by the decoding device 102 is supplied to the audio coding section 105. In the audio coding section 105, coding such as MPEG-2 Audio or AAC is performed on the uncompressed audio data, and an audio stream (audio elementary stream) is generated.

The video stream generated by the image coding section 104 and the audio stream generated by the audio coding section 105 are supplied to the multiplexing section 106. In the multiplexing section 106, the elementary streams are multiplexed, and a transport stream TS is obtained as transport data. In the multiplexing section 106, frame frequency information of the pictures in the lowest layer and layer number information indicating the number of the multiple layers is produced, and added to the transport layer (container layer). For example, in the multiplexing section 106, the FPS descriptor (fps_descriptor) stating the frame frequency information and the layer number information is placed in the descriptor loop under "ES_info_length" of the program map table (PMT) (see FIGS. 5 and 6).

Note that the frame frequency information and the layer number information may also be inserted in the video layer, such as, for example, an SEI message in the "SEIs" part of the access unit. In this case, FPS info (fps_info) including the information is inserted as an "fps_info SEI message" in the "SEIs" part of the access unit (see FIG. 7(b)). Subsequently, in this case, identification information identifying the existence of the SEI message is inserted into the transport layer (container layer). For example, in the multiplexing section 106, the FPS exist descriptor (fps_exit_descriptor) is placed in the descriptor loop under "ES_info_length" of the program map table (PMT) (see FIG. 7(a)).

The transport stream TS generated by the multiplexing section 106 is sent to the modulation/transmitting antenna section 108. In the modulation/transmitting antenna section 108, the transport stream TS is modulated according to a modulation scheme suited to broadcasting, such as QPSK/OFDM, and an RF modulated signal is generated. Subsequently, in the modulation/transmitting antenna section 108, the RF modulated signal is transmitted from a transmitting antenna.

[Exemplary Configuration of TV Receiver]

Figure 8:
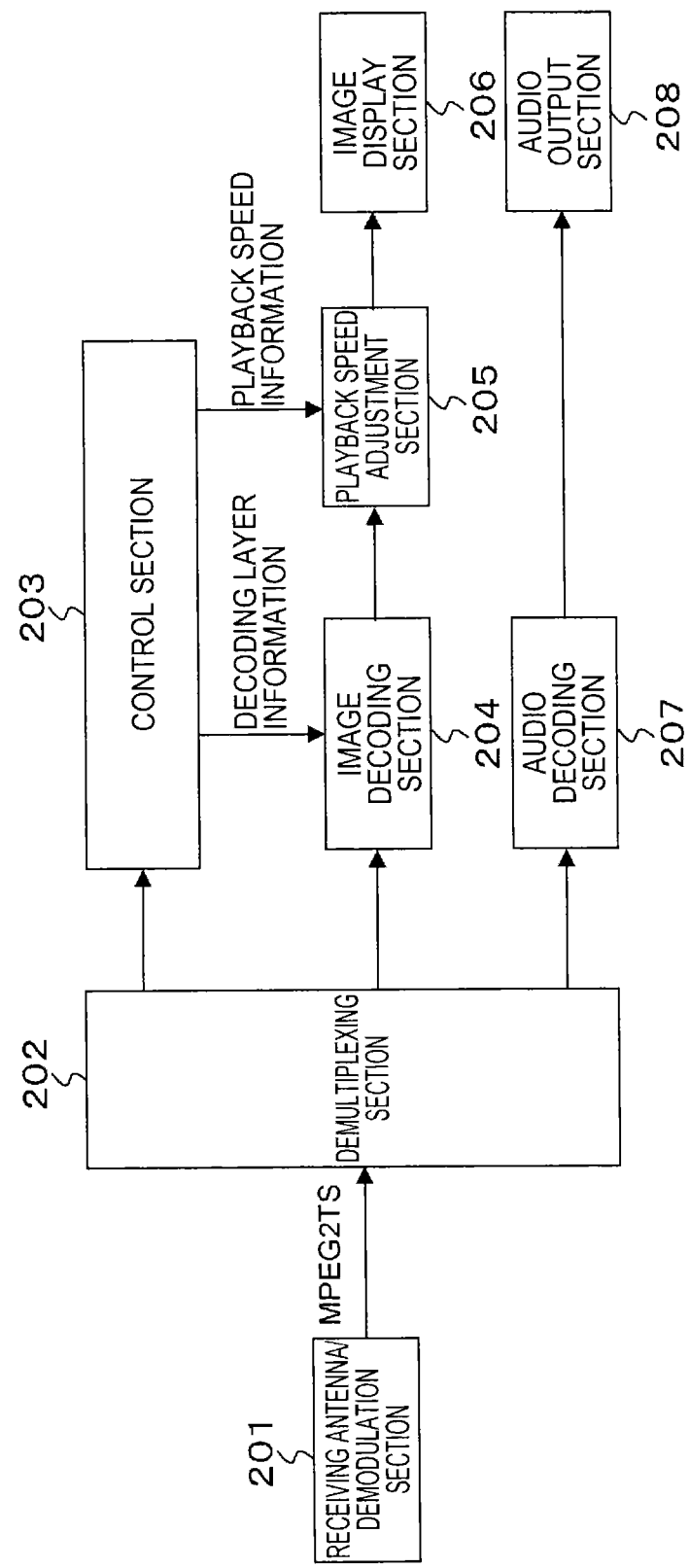
FIG. 8 is a block diagram illustrating an exemplary configuration of TV receiver constituting a TV transmitting/receiving system.

FIG. 8 illustrates an exemplary configuration of the TV receiver 200. The TV receiver 200 includes a receiving antenna/demodulation section 201, a demultiplexing section 202, a control section 203, an image decoding section 204, a playback speed adjustment section 205, an image display section 206, an audio decoding section 207, and an audio output section 208.

The receiving antenna/demodulation section 201 demodulates an RF modulated signal received with a receiving antenna, and acquires a transport stream TS. The demultiplexing section 202 respectively extracts the video stream and the audio stream from the transport stream TS. In the video stream, the image data of each picture constituting moving image data is classified into multiple layers, in which the image data is coded so that a referenced picture belongs to a layer of referencing image data and/or a lower layer than the layer of the referencing image data.

In addition, the demultiplexing section 202 extracts, and transmits to the control section 203, various information inserted into the transport layer (container layer) of the transport stream TS. At this point, the FPS descriptor (fps_descriptor) placed in the descriptor loop under "ES_info_length" of the program map table (PMT) is also extracted. In the FPS descriptor, frame frequency information of the pictures in the lowest layer and layer number information indicating the number of the multiple layers is stated.

Alternatively, if the frame frequency information and the layer number information is inserted into the video layer, such as an SEI message in the "SEIs" part of the access unit, for example, the FPS exist descriptor (fps_exit_descriptor) placed in the descriptor loop under "ES_info_length" of the program map table (PMT) may be extracted.

The image decoding section 204 selectively retrieves and decodes the coded image data in a prescribed layer and lower layers from the video stream demultiplexed by the demultiplexing section 202, and obtains the image data of each picture. At this point, the image decoding section 204 retrieves and decodes the coded image data of pictures in a desired layer on the basis of layer identification information (temporal_id) placed in the header part of the NAL unit of each picture. The playback speed adjustment section 205 adjusts the speed of image playback according to the decoded image data of each picture, so as to match the frame frequency of the pictures in the prescribed layer. In other words, the playback speed adjustment section 205 successively outputs the decoded image data of each picture to match the frame frequency (frame rate) of pictures in the prescribed layer.

The control section 203 controls the operation of each part of the TV receiver 200. The control section 203 controls the decoding layer by transmitting, to the image decoding section 204, decoding layer information specifying the prescribed layer and lower layers to be decoded. In addition, the control section 203 controls the image playback speed by transmitting, to the playback speed adjustment section 205, playback speed information corresponding to the frame frequency of the pictures in the prescribed layer, such as a synchronization signal, for example.

The control section 203 controls the decoding layer in the image decoding section 204 and the image playback speed in the playback speed adjustment section 205 on the basis of the frame frequency information, the layer number information, and the decoding performance of the TV receiver 200 itself. For example, consider the case of the FPS descriptor (fps_descriptor) having stated content as illustrated in FIG. 6.

In this case, the control section 203 knows that the frame frequency is 30 fps with the first layer only, 60 fps with the first/second combined layer, and 120 fps with the first to third combined layer. Additionally, if decoding capability of the TV receiver 200 itself goes up to a maximum of 60 fps, from this information the control section 203 knows that up to the first/second combined layer is decodable. Additionally, the control section 203 knows that it is sufficient to decode the pictures with "temporal_id=0" and "temporal_id=1". Also, the control section 203 knows that it is sufficient to play back decoded pictures at 60 fps.

The image display section 206 is made up of a display such as a liquid crystal display (LCD). The image display section 206 displays images according to the image data of each picture output from the playback speed adjustment section 205. The audio decoding section 207 performs decoding on the audio stream demultiplexed by the demultiplexing section 202, and obtains audio data corresponding to the image data obtained by the image decoding section 204. The audio output section 208 is made up of components such as an amp and speakers. The audio output section 208 outputs audio according to the audio data output from the audio decoding section 207.

Operations of the TV receiver 200 illustrated in FIG. 8 will be described. In the receiving antenna/demodulation section 201, an RF modulated signal received with a receiving antenna is demodulated, and a transport stream TS is acquired. This transport stream TS is supplied to the demultiplexing section 202. In the demultiplexing section 202, the video stream and the audio stream are respectively extracted from the transport stream TS. Herein, in the video stream, the image data of each picture constituting moving image data is classified into multiple layers, in which the image data is coded so that a referenced picture belongs to a layer of referencing image data and/or a lower layer than the layer of the referencing image data.

In addition, in the demultiplexing section 202, various information inserted into the transport layer (container layer) of the transport stream TS is extracted and transmitted to the control section 203. At this point, the FPS descriptor (fps_descriptor) placed in the descriptor loop under "ES_info_length" of the program map table (PMT) is also extracted. In the FPS descriptor, frame frequency information of the pictures in the lowest layer and layer number information indicating the number of the multiple layers is stated.

Alternatively, if the frame frequency information and the layer number information is inserted into the video layer, such as an SEI message in the "SEIs" part of the access unit, for example, the FPS exist descriptor (fps_exit_descriptor) placed in the descriptor loop under "ES_info_length" of the program map table (PMT) may be extracted.

In the control section 203, it is determined up to which layer is decodable, on the basis of the frame frequency information, layer number information, and decoding performance of the TV receiver 200 itself. In addition, by this control section 203, the decoding layer in the image decoding section 204 is controlled, and the image playback speed in the playback speed adjustment section 205 is controlled.

The video stream demultiplexed by the demultiplexing section 202 is supplied to the image decoding section 204. In the image decoding section 204, under control by the control section 203, the coded image data in a prescribed layer and lower layers is selectively retrieved and decoded from the video stream, and the image data of each picture is successively obtained. The image data of each picture decoded in this way is supplied to the playback speed adjustment section 205.

In the playback speed adjustment section 205, under control by the control section 203, the speed of image playback according to the image data of each picture is adjusted so as to match the frame frequency of the pictures in the prescribed layer. In other words, from the playback speed adjustment section 205, the image data of each picture is successively output to match the frame frequency (frame rate) of pictures in the prescribed layer. The image data is supplied to the image display section 206, and images according to the image data of each picture in the prescribed layer and lower layers are displayed.

Also, the audio stream demultiplexed by the demultiplexing section 202 is supplied to the audio decoding section 207. In the audio decoding section 207, decoding is performed on the audio stream, and audio data corresponding to the image data obtained by the image decoding section 204 is obtained. The audio data is supplied to the audio output section 208, and audio corresponding to the displayed images is output.

Figure 9:
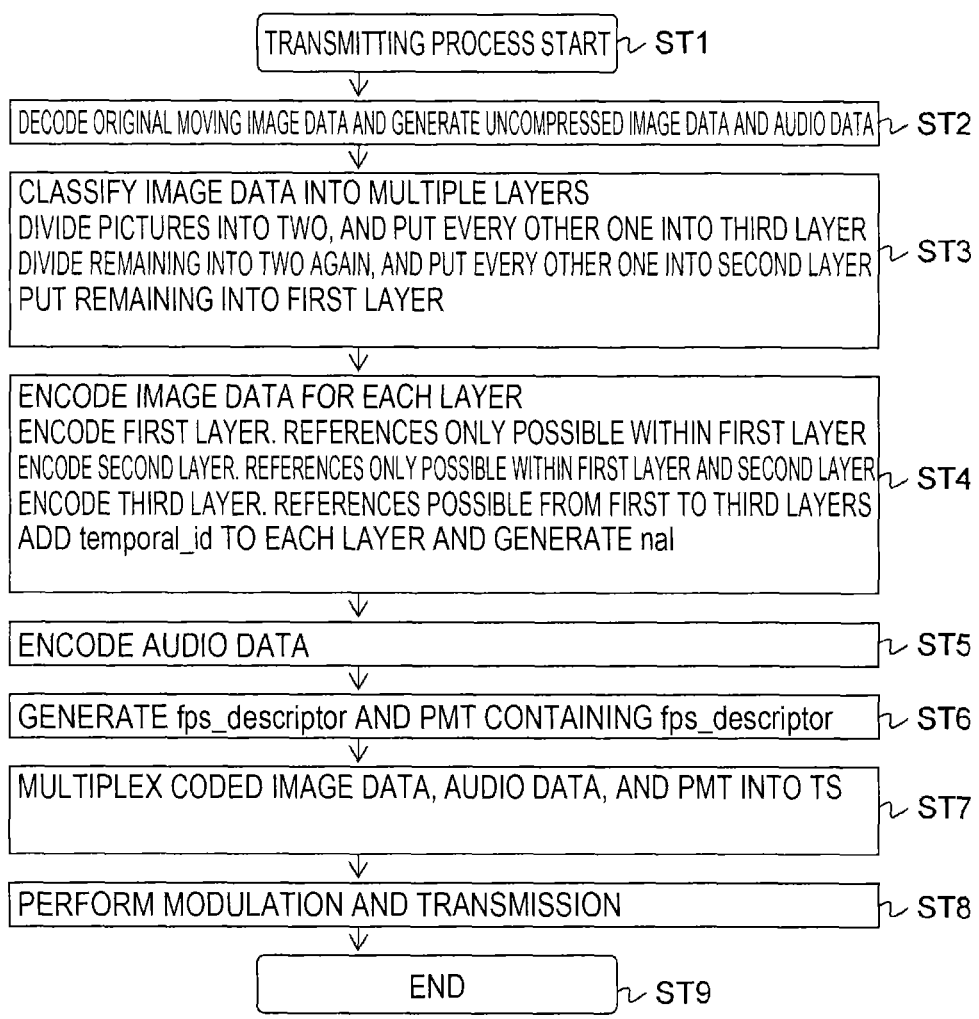
FIG. 9 is a flowchart illustrating an example of a transmitting processing sequence in the case in which an FPS descriptor (fps_descriptor) is placed in the same PID and under a PMT.

The flowchart in FIG. 9 illustrates an example of a transmitting processing sequence in the TV transmitter 100 illustrated in FIG. 2, in the case in which the FPS descriptor (fps_descriptor) is placed under the PMT. Note that in the TV transmitter 100 illustrated in FIG. 2, in the image coding section 104, a single video stream holding the coded image data of pictures in respective layers is generated, as discussed earlier.

First, in step ST1, the TV transmitter 100 starts the transmitting process. Subsequently, in step ST2, the TV transmitter 100 decodes original moving image data, and generates uncompressed image data and audio data.

Next, in step ST3, the TV transmitter 100 classifies the image data of each picture into multiple layers. In this case, the pictures (frames) are divided into two, and every other one is put into the third layer. Additionally, the other pictures (frames) are divided into two again, and every other one is put into the second layer, while the remaining are put into the first layer.

Next, in step ST4, the TV transmitter 100 encodes the image data of each hierarchically classified picture. In this case, the first layer is encoded. In this case, references are made possible only within the first layer. Also, the second layer is encoded. In this case, references are made possible within the first layer and the second layer. Also, the third layer is encoded. In this case, references are made possible within the first layer to the third layer. At this point, the TV transmitter 100 places layer identification information (temporal_id) in the header part of the NAL unit (nal_unit) of each picture.

Next, in step ST5, the TV transmitter 100 encodes the audio data. Subsequently, in step ST6, the TV transmitter 100 generates the FPS descriptor (fps_descriptor) and the PMT containing the FPS descriptor.

Next, in step ST7, the TV transmitter 100 multiplexes the coded image data, audio data, and PMT into a transport stream TS. Subsequently, in step ST8, the TV transmitter 100 modulates and transmits the transport stream TS. After that, in step ST9, the TV transmitter 100 ends the process.

Figure 10:
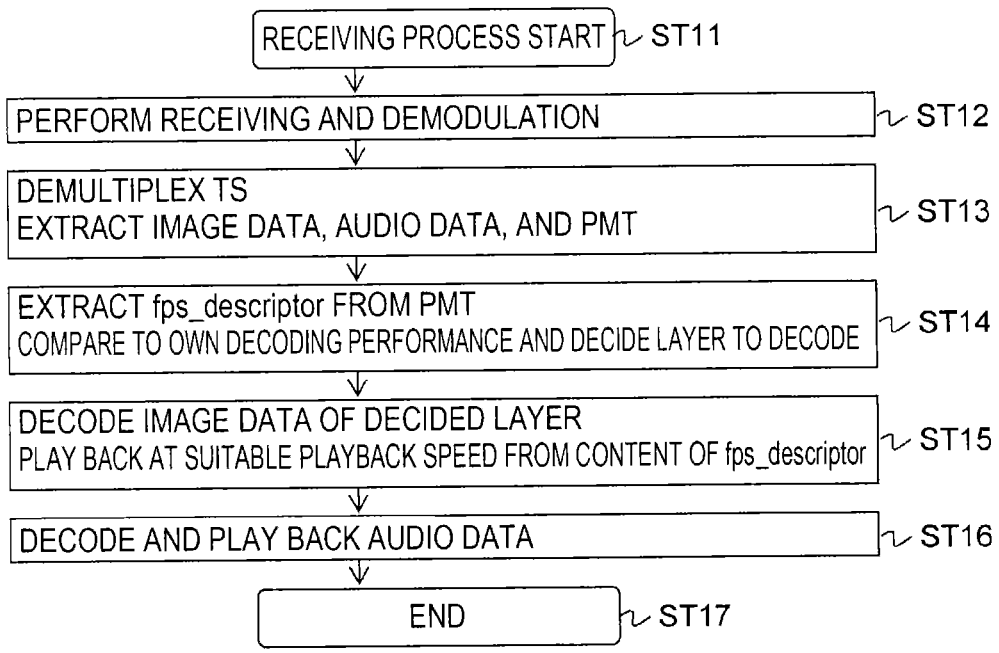
FIG. 10 is a flowchart illustrating an example of a receiving processing sequence in the case in which an FPS descriptor (fps_descriptor) is placed in the same PID and under a PMT.

The flowchart in FIG. 10 illustrates an example of a receiving processing sequence in the TV receiver 200 illustrated in FIG. 8, in the case in which the FPS descriptor (fps_descriptor) is placed in the descriptor loop under "ES_info_length" of the PMT. This receiving processing sequence corresponds to the transmitting processing sequence illustrated by the flowchart in FIG. 9 discussed above.

First, in step ST11, the TV receiver 200 starts the receiving process. Subsequently, in step ST12, the TV receiver 200 receives and demodulates the RF modulated signal (broadcast signal), and obtains the transport stream TS.

Next, in step ST13, the TV receiver 200 extracts image data, audio data, and the PMT from the transport stream TS. Subsequently, in step S14, the TV receiver 200 extracts the FPS descriptor (fps_descriptor) from the PMT, compares the FPS descriptor to the decoding performance of the TV receiver 200 itself, and decides the layer to decode.

Next, in step ST15, the TV receiver 200 decodes the image data of pictures in the layer decided in step ST14. Subsequently, playback is conducted at a suitable playback speed from the content of the FPS descriptor (fps_descriptor). Additionally, in step ST16, the TV receiver 200 decodes and plays back audio data. After that, in step ST17, the TV receiver 200 ends the process.

Figure 11:
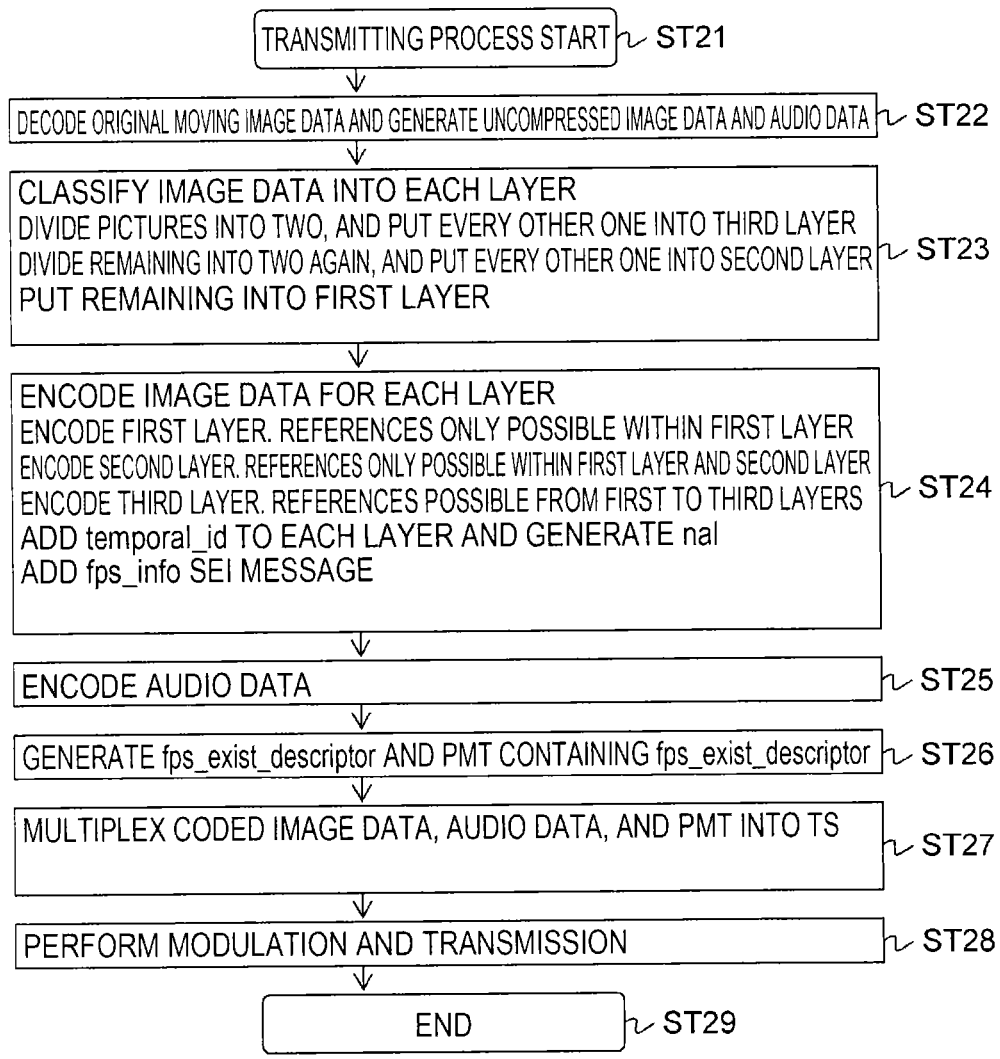
FIG. 11 is a flowchart illustrating an example of a transmitting processing sequence in the case of adding an FPS info (fps_info) SEI message in the same PID.

The flowchart in FIG. 11 illustrates an example of a transmitting processing sequence in the TV transmitter 100 illustrated in FIG. 2, in the case of adding an FPS info (fps_info) SEI message. Note that in the TV transmitter 100 illustrated in FIG. 2, in the image coding section 104, a single video stream holding the coded image data in respective layers is generated, as discussed earlier.

First, in step ST21, the TV transmitter 100 starts the transmitting process. Subsequently, in step ST22, the TV transmitter 100 decodes original moving image data, and generates uncompressed image data and audio data.

Next, in step ST23, the TV transmitter 100 classifies the image data of each picture into multiple layers. In this case, the pictures (frames) are divided into two, and every other one is put into the third layer. Additionally, the other pictures (frames) are divided into two again, and every other one is put into the second layer, while the remaining are put into the first layer.

Next, in step ST24, the TV transmitter 100 encodes the image data of each hierarchically classified picture. In this case, the first layer is encoded. In this case, references are possible only within the first layer. Also, the second layer is encoded. In this case, references are possible within the first layer and the second layer. Also, the third layer is encoded. In this case, references are possible within the first layer to the third layer. At this point, the TV transmitter 100 places layer identification information (temporal_id) in the header part of the NAL unit (nal_unit) of each picture. In addition, the TV transmitter 100 adds an FPS info (fps_info) SEI message.

Next, in step ST25, the TV transmitter 100 encodes the audio data. Subsequently, in step ST26, the TV transmitter 100 generates the FPS exist descriptor (fps_exist_descriptor) and the PMT containing the FPS exist descriptor.

Next, in step ST27, the TV transmitter 100 multiplexes the coded image data, audio data, and PMT into a transport stream TS. Subsequently, in step ST28, the TV transmitter 100 modulates and transmits the transport stream TS. After that, in step ST29, the TV transmitter 100 ends the process.

Figure 12:
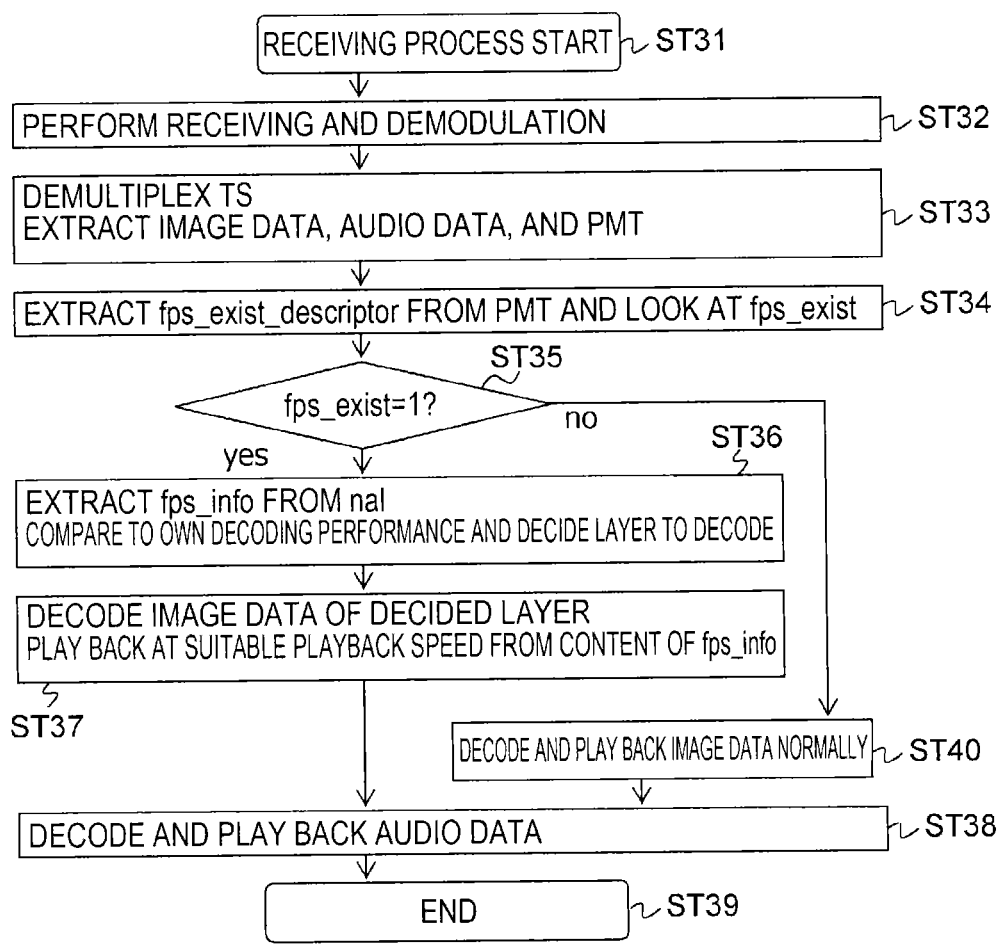
FIG. 12 is a flowchart illustrating an example of a receiving processing sequence in the case in which an FPS info (fps_info) SEI message is added in the same PID.

The flowchart in FIG. 12 illustrates an example of a receiving processing sequence in the TV receiver 200 illustrated in FIG. 8, in the case in which an FPS info (fps_info) SEI message is added. This receiving processing sequence corresponds to the transmitting processing sequence illustrated by the flowchart in FIG. 11 discussed above.

First, in step ST31, the TV receiver 200 starts the receiving process. Subsequently, in step ST32, the TV receiver 200 receives and demodulates the RF modulated signal (broadcast signal), and obtains the transport stream TS.

Next, in step ST33, the TV receiver 200 extracts image data, audio data, and the PMT from the transport stream TS. In step S34, the TV receiver 200 extracts the FPS exist descriptor (fps_exit_descriptor) from the PMT, and looks at "fps_exit". Then, in step ST35, the TV receiver 200 judges whether or not "fps_exit=1".

When "fps_exit=1", in step ST36, the TV receiver 200 extracts the FPS info (fps_info) added as an SEI message, compares the FPS info to the decoding performance of the TV receiver 200 itself, and decides the layer to decode. In step ST37, the TV receiver 200 decodes the image data of pictures in the layer decided in step ST36. Subsequently, playback is conducted at a suitable playback speed from the content of the FPS info (fps_info). Additionally, in step ST38, the TV receiver 200 decodes and plays back audio data. After that, in step ST39, the TV receiver 200 ends the process.

Also, when "fps_exit=0" in step ST35, in step ST40, the TV receiver 200 decodes and plays back the image data normally. Additionally, in step ST38, the TV receiver 200 decodes and plays back audio data. After that, in step ST39, the TV receiver 200 ends the process.

As described above, in the TV transmitting/receiving system 10 illustrated in FIG. 1, the image data of each picture constituting moving image data is classified into multiple layers, and a video stream holding the coded image data of each layer is transmitted. For this reason, on the transmitting side, by simply transmitting one program or one file, a service supporting various frame frequencies may be provided, and a reduction in operating costs becomes possible.

Meanwhile, on the receiving side, the coded image data in a prescribed layer and lower layers may be selectively retrieved and decoded, enabling playback at a frame frequency suited to the playback performance of the receiving side itself, thereby effectively promoting the adoption of receivers. Herein, image data is coded so that a referenced picture belongs to a layer of referencing image data and/or a lower layer than the layer of the referencing image data, and at a receiver, the playback performance of the receiving side itself may be used effectively without needing to decode layers higher than the prescribed layer.

Also, in the TV transmitting/receiving system 10 illustrated in FIG. 1, the image coding section 104 generates a single video stream holding the encoded image data of each layer, and for each picture, adds layer identification information (temporal_id) for identifying the layer containing the picture to the coded image data of each layer. For this reason, on the receiving side, it is possible to conduct good selective retrieval of coded image data in a prescribed layer and lower layers, on the basis of the layer identification information.

Also, in the TV transmitting/receiving system 10 illustrated in FIG. 1, the hierarchical classification section 103 classifies the image data of each picture constituting the moving image data into multiple layers so that, except for the lowest layer, the pictures belonging to each layer are equal in number to the pictures belonging to all lower layers, and in addition, are positioned in the temporal center between the pictures belonging to all lower layers. For this reason, the frame frequency doubles every time the layer is raised by one, and thus on the receiving side, it becomes possible to easily recognize the frame frequency in each layer with only the frame frequency information of the pictures in the lowest layer.

Also, in the TV transmitting/receiving system 10 illustrated in FIG. 1, frame frequency information of the pictures in the lowest layer and layer number information indicating the number of the multiple layers is inserted into the container layer (transport layer) or the video layer. For this reason, on the receiving side, it becomes possible to easily acquire the frame frequency information of the pictures in the lowest layer and the layer number information indicating the number of the multiple layers.

2. Modifications

Example of Different PIDs

Note that the foregoing embodiment illustrates an example in which, in the image coding section 104, a single video stream holding the coded image data of each layer is generated, or in other words, an example of the same PID. However, in the image coding section 104, it is also conceivable for multiple video streams holding the image data of each of multiple layers to be generated.

Figure 13:
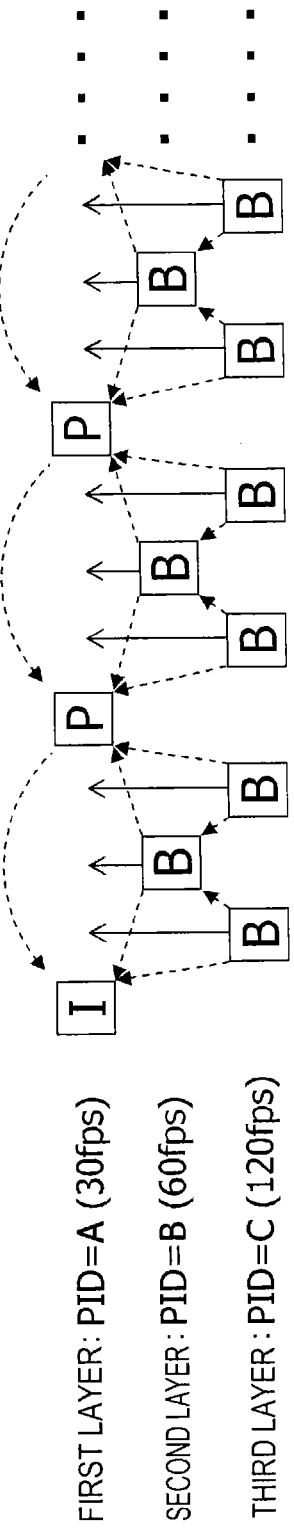
FIG. 13 is a diagram illustrating the allocation of respective layers according to different PIDs in the case of generating multiple video streams having image data in each of the multiple layers during image coding.

In this case, as illustrated in FIG. 13, a different PID is assigned to each layer. Respectively different PIDs are assigned when multiplexing the NAL units of each layer separated by the hierarchical layering of the video layer into transport stream packets. In comparison to the case of putting all layers into the same PID as in the embodiment discussed above, differences such as the following exist.

Case of Same PID (a) On the receiving side (decoding side), only the TS packets of one PID are acquired.

(b) The nal header is analyzed, "temporal_id" is detected, and only nal units with the required "temporal_id" are decoded.

Case of Different PIDs (a) On the receiving side (decoding side), the required TS packets of multiple PIDs are acquired.

(b) All nal units inside the acquired TS packets of the PIDs are decoded. The "temporal_id" may or may not exist.

In the case of different PIDs, a structure descriptor (structure_descriptor) is placed in the descriptor loop under "program_info_length" of the PMT, for example. FIG. 14 illustrates example syntax of the structure descriptor. The 8-bit field "descriptor_tag" indicates the class of the descriptor, and herein indicates that the descriptor is the structure descriptor. For example, the currently unused "0xf1" is assigned. The 8-bit field "descriptor_length" indicates the immediately following byte length.

The 8-bit field "base" expresses the frame frequency information of pictures in the lowest layer, or in other words the frame frequency information of the first layer. For example, in the case of 30 fps as in the example illustrated in FIG. 13, the value is "0x1e" indicating 30. The 8-bit field "max" expresses layer number information indicating the number of the multiple layers. For example, in the case of layers up to the third layer as in the example illustrated in FIG. 13, the value is "0x03" indicating 3.

Inside the for loop, the PIDs assigned to each layer (layer_PID) are all stated. The statement order is sequential from the first layer, for example. On the decoding side, the TS packets of which PIDs should be acquired is known from the value of "base" and the listed PIDs.

In addition, it is also conceivable to use the FPS info (fps_info) SEI message illustrated in FIG. 15(b) with different PIDs. In this case, the structure descriptor (structure_descriptor) illustrated in FIG. 15(a) is placed in the descriptor loop under "program_info_length". On the receiving side (decoding side), TS packets of the PID of the first layer stated at the beginning of the for loop of the structure descriptor are acquired, and the SEI message inside, that is, the FPS info (fps_info), is extracted. The layer to be decoded is judged from the value of "base", the PIDs of the TS packets to be acquired are detected from the "layer_PID" of the structure descriptor, and the desired TS packets are acquired and decoded.

Figure 16:
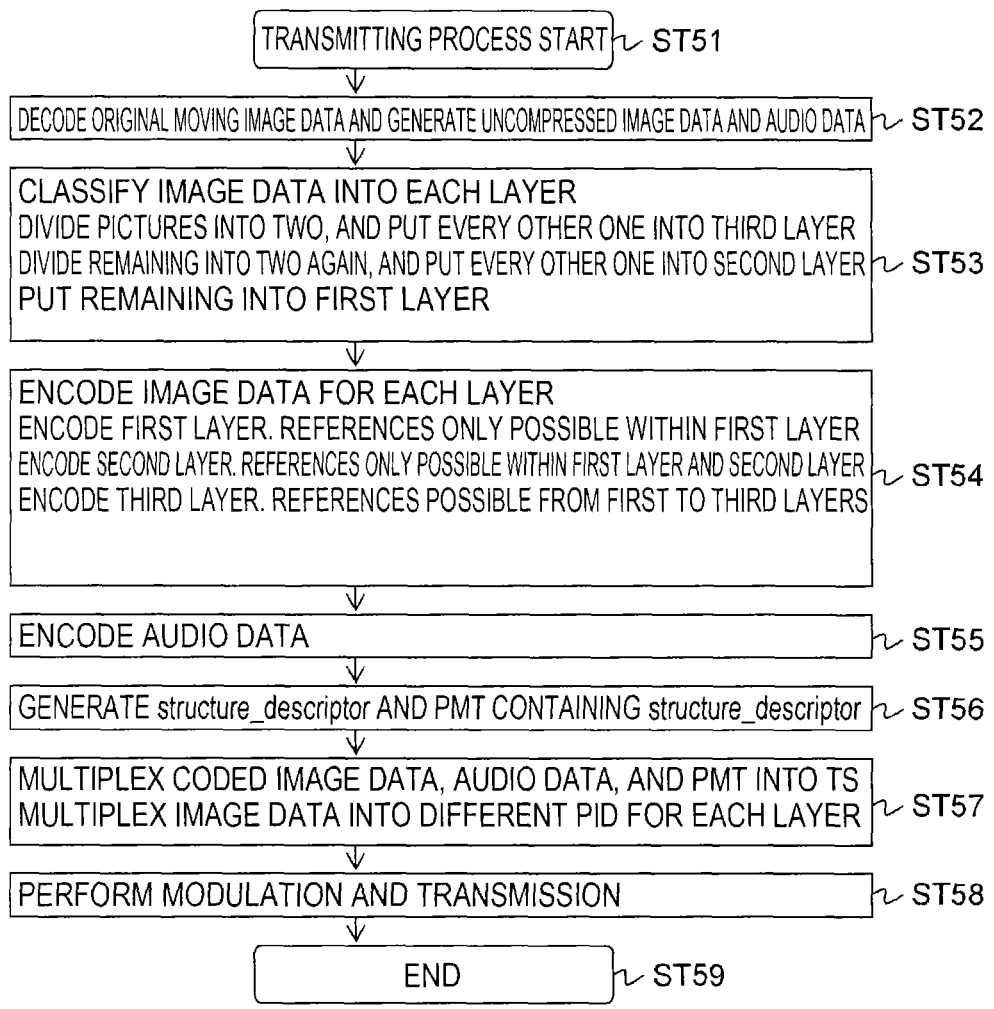
FIG. 16 is a flowchart illustrating an example of a transmitting processing sequence in the case in which an FPS descriptor (fps_descriptor) is placed in different PIDs and under a PMT.

The flowchart in FIG. 16 illustrates an example of a transmitting processing sequence for the case of being configured so that the TV transmitter 100 codes the image data of each layer in different PIDs, and the FPS descriptor (structure_descriptor) is placed under the PMT.

First, in step ST51, the TV transmitter 100 starts the transmitting process. Subsequently, in step ST52, the TV transmitter 100 decodes original moving image data, and generates uncompressed image data and audio data.

Next, in step ST53, the TV transmitter 100 classifies the image data of each picture into multiple layers. In this case, the pictures (frames) are divided into two, and every other one is put into the third layer. Additionally, the other pictures (frames) are divided into two again, and every other one is put into the second layer, while the remaining are put into the first layer.

Next, in step ST54, the TV transmitter 100 encodes the image data of each hierarchically classified picture. The first layer is encoded. In this case, references are possible only within the first layer. Also, the second layer is encoded. In this case, references are possible within the first layer and the second layer. Also, the third layer is encoded. In this case, references are possible within the first layer to the third layer.

Next, in step ST55, the TV transmitter 100 encodes the audio data. Subsequently, in step ST56, the TV transmitter 100 generates the structure descriptor (structure_descriptor) and the PMT containing the FPS exist descriptor.

Next, in step ST57, the TV transmitter 100 multiplexes the coded image data, audio data, and PMT into a transport stream TS. Subsequently, the TV transmitter 100 multiplexes the image data with different PIDs for each layer. Subsequently, in step ST58, the TV transmitter 100 modulates and transmits the transport stream TS. After that, in step ST59, the TV transmitter 100 ends the process.

Figure 17:
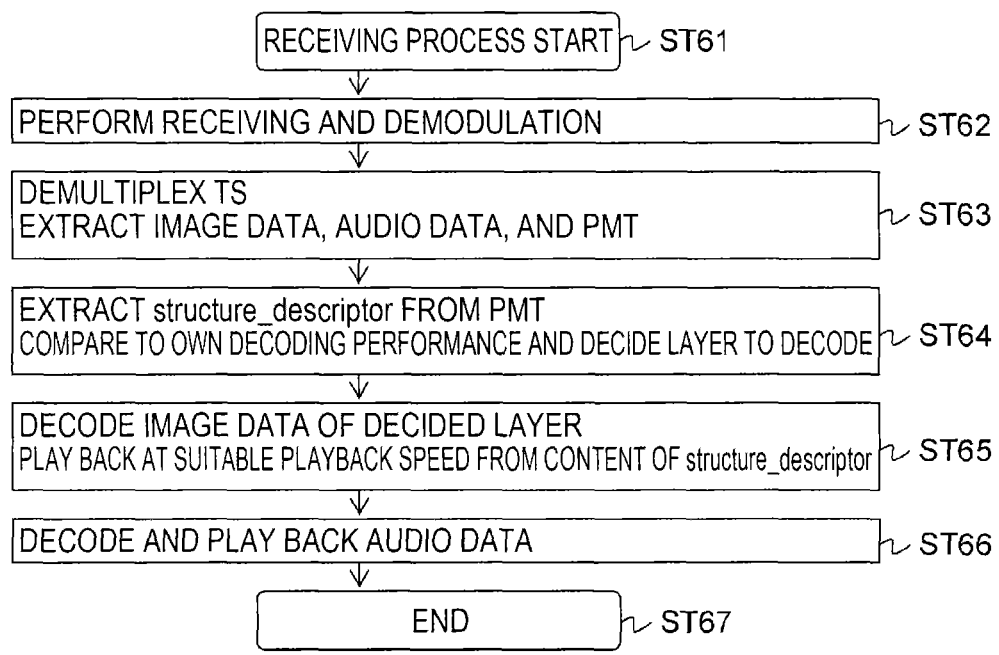
FIG. 17 is a flowchart illustrating an example of a receiving processing sequence in the case in which an FPS descriptor (fps_descriptor) is placed in different PIDs and under a PMT.

The flowchart in FIG. 17 illustrates an example of a receiving processing sequence in the TV receiver 200 illustrated in FIG. 8, in the case in which the image data of each layer is encoded with different PIDs, and the structure descriptor (structure_descriptor) is placed under the PMT. This receiving processing sequence corresponds to the transmitting processing sequence illustrated by the flowchart in FIG. 16 discussed above.

First, in step ST61, the TV receiver 200 starts the receiving process. Subsequently, in step ST62, the TV receiver 200 receives and demodulates the RF modulated signal (broadcast signal), and obtains the transport stream TS.

Next, in step ST63, the TV receiver 200 extracts image data, audio data, and the PMT from the transport stream TS. Subsequently, in step S64, the TV receiver 200 extracts the structure descriptor (structure_descriptor) from the PMT, compares the structure descriptor to the decoding performance of the TV receiver 200 itself, and decides the layer to decode.

Next, in step ST65, the TV receiver 200 decodes, from the TS packets of each PID, the image data of pictures in the layer decided in step ST64. Subsequently, playback is conducted at a suitable playback speed from the content of the structure descriptor (structure_descriptor). Additionally, in step ST66, the TV receiver 200 decodes and plays back audio data. After that, in step ST67, the TV receiver 200 ends the process.

Figure 18:
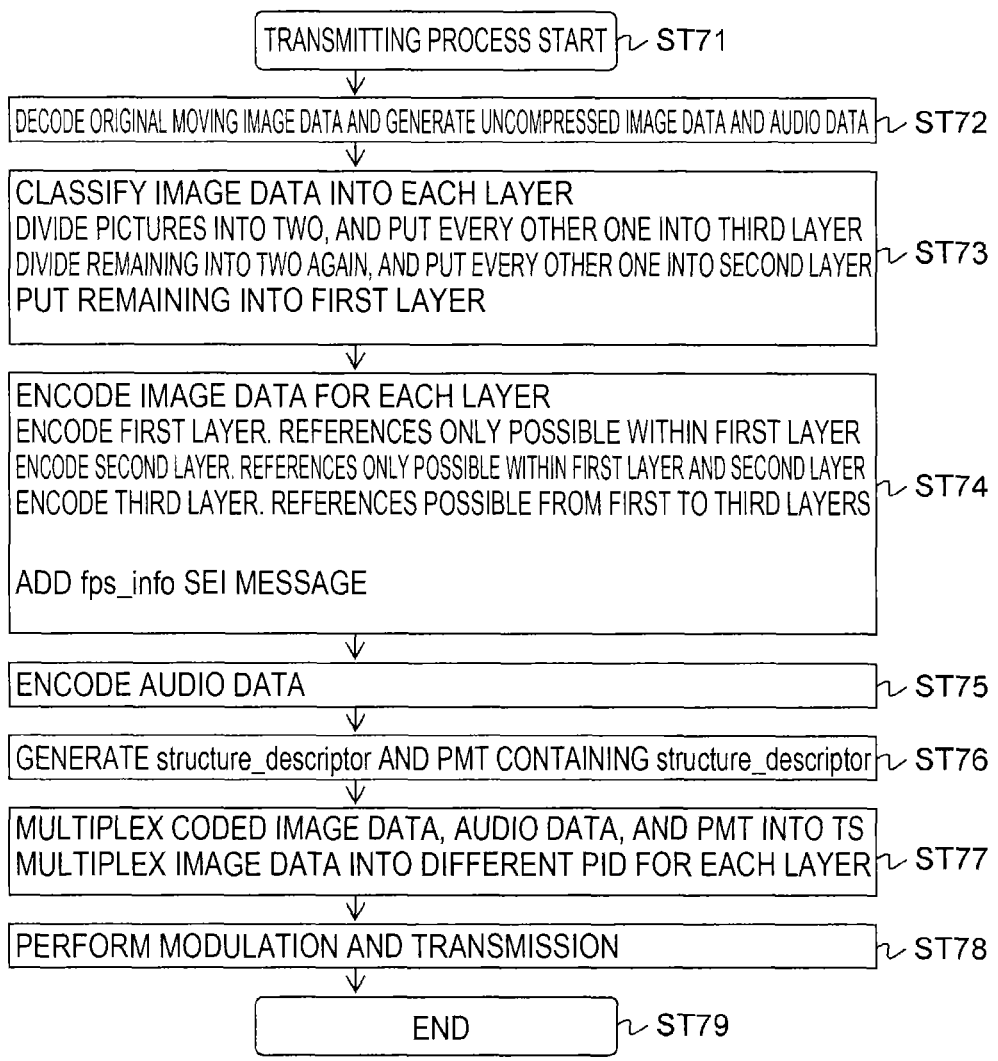
FIG. 18 is a flowchart illustrating an example of a transmitting processing sequence in the case of adding an FPS info (fps_info) SEI message in different PIDs.

The flowchart in FIG. 18 illustrates an example of a transmitting processing sequence for the case in which the TV transmitter 100 codes the image data of each layer with different PIDs, and adds an FPS info (fps_info) SEI message.

First, in step ST71, the TV transmitter 100 starts the transmitting process. Subsequently, in step ST72, the TV transmitter 100 decodes original moving image data, and generates uncompressed image data and audio data.

Next, in step ST73, the TV transmitter 100 classifies the image data of each picture into multiple layers. In this case, the pictures (frames) are divided into two, and every other one is put into the third layer. Additionally, the other pictures (frames) are divided into two again, and every other one is put into the second layer, while the remaining are put into the first layer.

Next, in step ST74, the TV transmitter 100 encodes the image data of each hierarchically classified picture. The first layer is encoded. In this case, references are possible only within the first layer. Also, the second layer is encoded. In this case, references are possible within the first layer and the second layer. Also, the third layer is encoded. In this case, references are possible within the first layer to the third layer. At this point, the TV transmitter 100 adds an FPS info (fps_info) SEI message.

Next, in step ST75, the TV transmitter 100 encodes the audio data. Subsequently, in step ST76, the TV transmitter 100 generates the structure descriptor (structure_descriptor) and the PMT containing the FPS exist descriptor.

Next, in step ST77, the TV transmitter 100 multiplexes the coded image data, audio data, and PMT into a transport stream TS. Subsequently, the TV transmitter 100 multiplexes the image data with different PIDs for each layer. Subsequently, in step ST78, the TV transmitter 100 modulates and transmits the transport stream TS. After that, in step ST79, the TV transmitter 100 ends the process.

Figure 19:
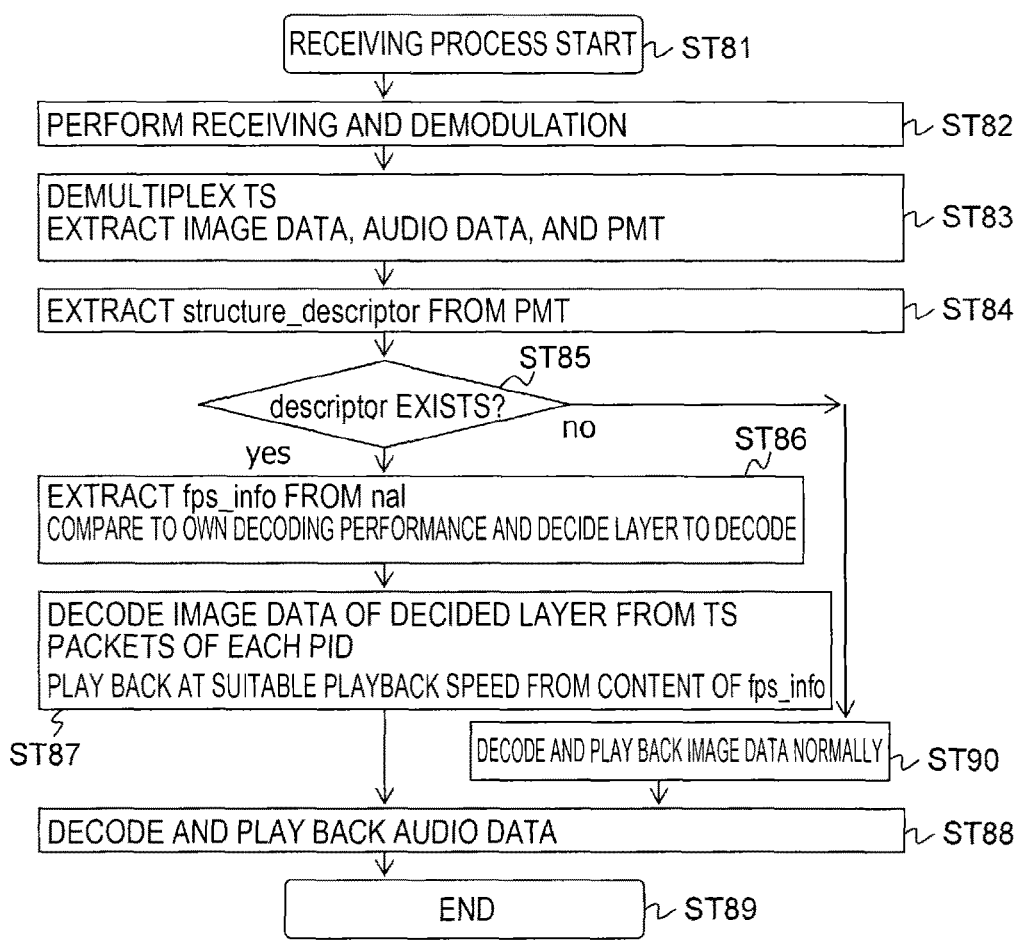
FIG. 19 is a flowchart illustrating an example of a receiving processing sequence in the case in which an FPS info (fps_info) SEI message is added in different PIDs.

The flowchart in FIG. 19 illustrates an example of a receiving processing sequence in the TV receiver 200 illustrated in FIG. 8, in the case in which the image data of each layer is coded with different PIDs, and an FPS info (fps_info) SEI message is added. This receiving processing sequence corresponds to the transmitting processing sequence illustrated by the flowchart in FIG. 18 discussed above.

First, in step ST81, the TV receiver 200 starts the receiving process. Subsequently, in step ST82, the TV receiver 200 receives and demodulates the RF modulated signal (broadcast signal), and obtains the transport stream TS.

Next, in step ST83, the TV receiver 200 extracts image data, audio data, and the PMT from the transport stream TS. In step S84, the TV receiver 200 extracts the structure descriptor (structure_descriptor) from the PMT. Then, in step ST85, the TV receiver 200 judges whether or not the structure descriptor exists.

When the structure descriptor exists, in step ST86, the TV receiver 200 extracts the FPS info (fps_info) added as an SEI message, compares the FPS info to the decoding performance of the TV receiver 200 itself, and decides the layer to decode. In step ST77, the TV receiver 200 decodes, from the TS packets of each PID, the image data of pictures in the layer decided in step ST76. Subsequently, playback is conducted at a suitable playback speed from the content of the FPS info (fps_info). Additionally, in step ST88, the TV receiver 200 decodes and plays back audio data. After that, in step ST89, the TV receiver 200 ends the process.

Also, when the structure descriptor does not exist in step ST85, in step ST90, the TV receiver 200 decodes and plays back the image data normally. Additionally, in step ST88, the TV receiver 200 decodes and plays back audio data. After that, in step ST89, the TV receiver 200 ends the process.

Figure 20:
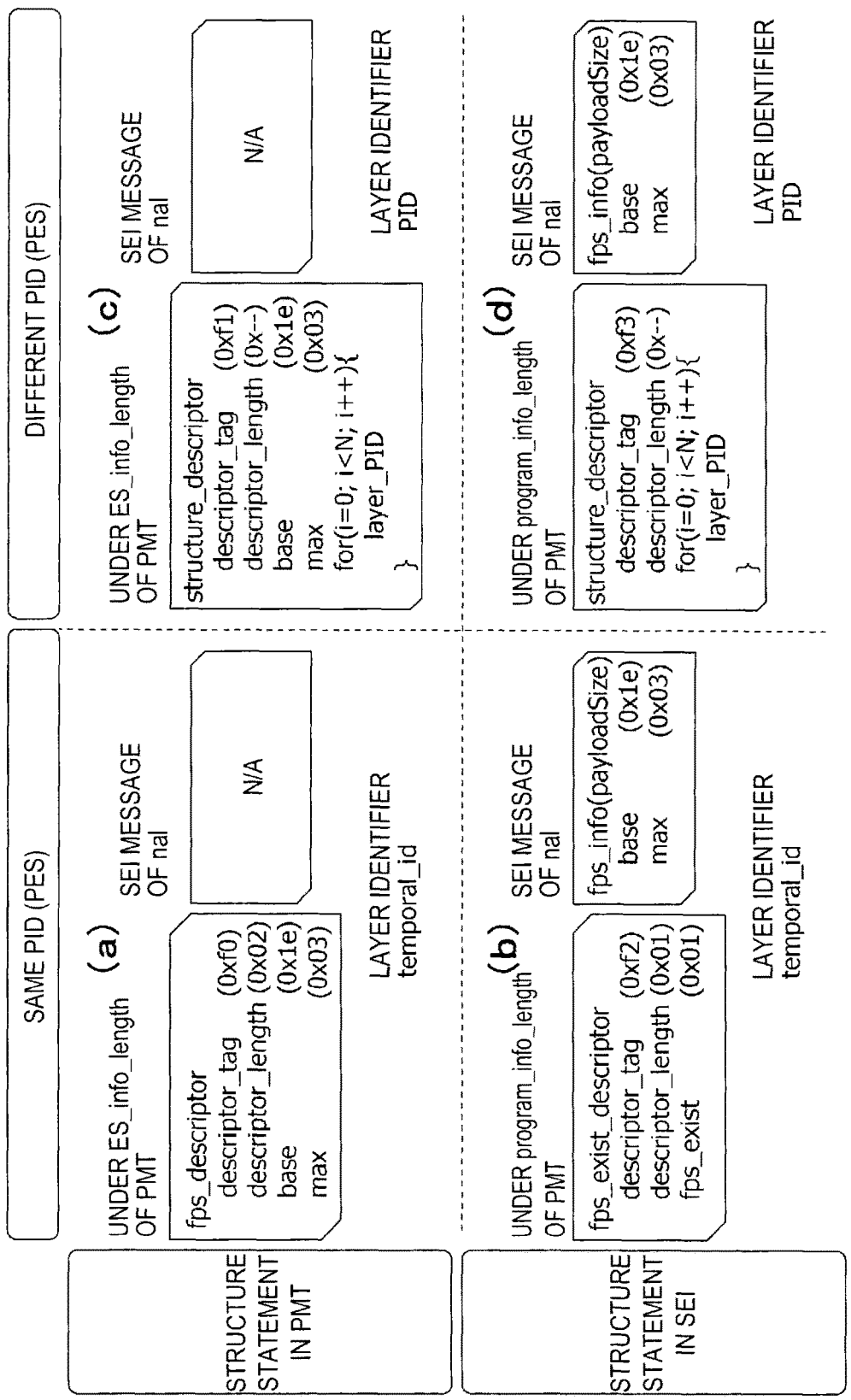
FIG. 20 is a diagram illustrating a comparison of additional information for four methods of (a) syntax statements with the same PID (PES) and in the PMT, (b) syntax statements with the same PID (PES) and in the SEI, (c) syntax statements in different PIDs (PES) and in the PMT, and (d) syntax statements in different PIDs (PES) and in the SEI.

FIG. 20 illustrates a comparison of additional information for the above four methods of (a) syntax statements with the same PID (PES) and in the PMT, (b) syntax statements with the same PID (PES) and in the SEI, (c) syntax statements in different PIDs (PES) and in the PMT, and (d) syntax statements in different PIDs (PES) and in the SEI.

Other Examples of Hierarchical Classification and Image Coding

Also, the foregoing embodiments illustrates an example of classifying the image data of each picture constituting the moving image data into multiple layers so that, except for the lowest layer, the pictures belonging to each layer are equal in number to the pictures belonging to all lower layers, and in addition, are positioned in the temporal center between the pictures belonging to all lower layers. However, the classification method is not limited to such an example. For example, classification methods like the following are also possible.

Other Example 1

Figure 21:
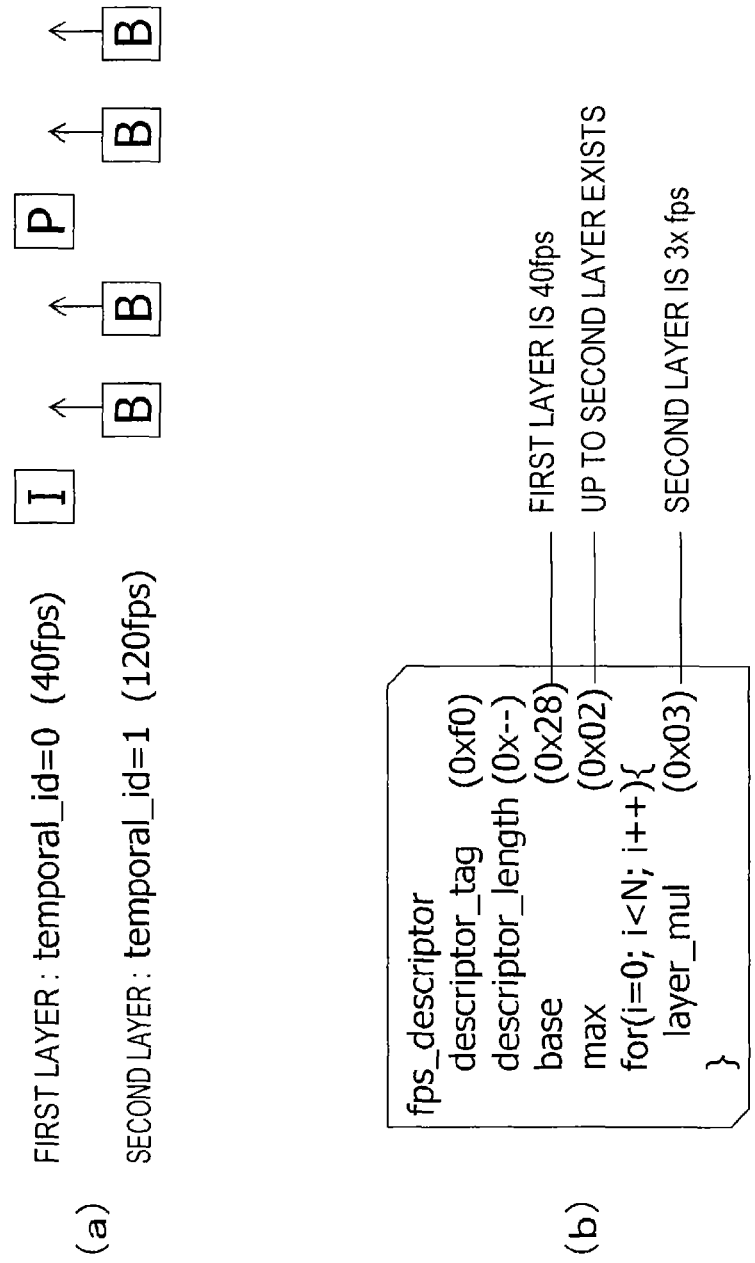
FIG. 21 is a diagram for explaining another example of hierarchical classification and image coding.

FIG. 21(a) illustrates another example of hierarchical classification and image coding. This example is an example of classifying the image data of each picture into the two layers of a first layer and a second layer. In this example, I pictures and P pictures are made to belong to the first layer. An I picture does not reference another picture, while a P picture only references an I picture or a P picture. For this reason, the first layer is decodable with just first layer pictures.

In addition, two B pictures are placed at equal intervals temporally between each picture in the first layer, and are made to belong to the second layer. The B pictures in the second layer are encoded so as to only reference pictures belonging to the second layer and/or the first layer. For this reason, the second layer is decodable with just the first/second combined layer. Also, compared to the case of decoding the first layer only, the frame frequency is tripled when decoding the first/second combined layer. Consequently, as illustrated in the drawing, when the frame frequency of the first layer only is 40 fps, the frame frequency of the first/second combined layer is 120 fps.

Likewise in this example, for each picture, layer identification information for identifying the layer containing the picture is added to the coded image data of each layer. In other words, layer identification information (temporal_id) is placed in the header part of the NAL unit (nal_unit) of each picture. In this example, "temporal_id=0" is assigned to pictures belonging to the first layer, and "temporal_id=1" is assigned to pictures belonging to the second layer.

FIG. 21(b) illustrates example syntax of the FPS descriptor (fps_descriptor) in the case in which hierarchical classification and image coding as illustrated in FIG. 21(a) is conducted. The 8-bit field "descriptor_tag" indicates the class of the descriptor, and herein indicates that the descriptor is the FPS descriptor. For example, the currently unused "0xf0" is allocated. The 8-bit field "descriptor_length" indicates the immediately following byte length.

The 8-bit field "base" expresses the frame frequency information of pictures in the lowest layer, or in other words the frame frequency information of the first layer. In this example, the value is "0x28" indicating 40. The 8-bit field "max" expresses layer number information indicating the number of the multiple layers. In this example, the value is "0x02" indicating 2. Also, inside the for loop, the multiples of the frame frequency in the combined layer up to each layer in the second layer and subsequent layers versus the frame frequency of the first layer are all stated. In this example, the value is "0x03" for the second layer, which states that the multiple is 3×.

Other Example 2

Figure 22:
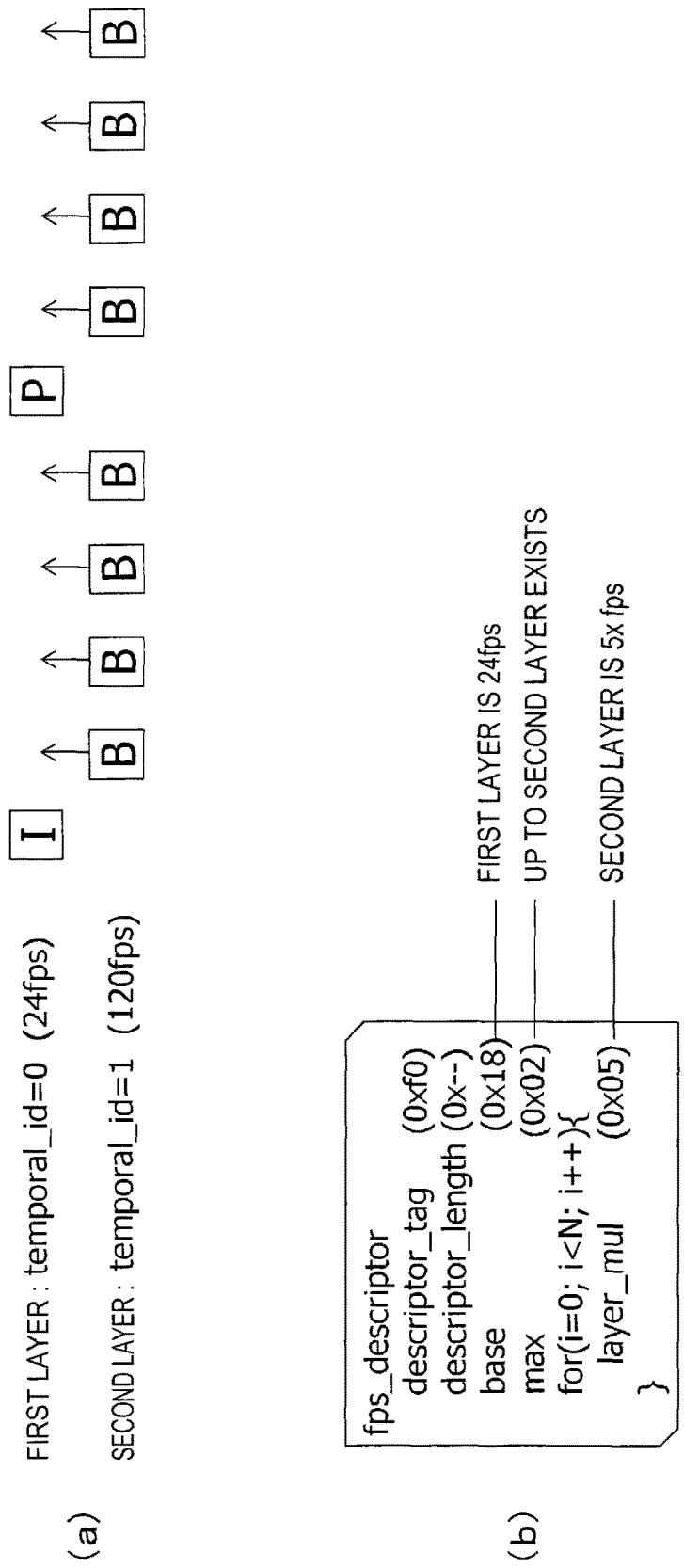
FIG. 22 is a diagram for explaining another example of hierarchical classification and image coding.

FIG. 22(a) also illustrates another example of hierarchical classification and image coding. This example is an example of classifying the image data of each picture into the two layers of a first layer and a second layer. In this example, I pictures and P pictures are made to belong to the first layer. An I picture does not reference another picture, while a P picture only references an I picture or a P picture. For this reason, the first layer is decodable with just first layer pictures.

In addition, four B pictures are placed at equal intervals temporally between each picture in the first layer, and are made to belong to the second layer. The B pictures in the second layer are encoded so as to only reference pictures belonging to the second layer and/or the first layer. For this reason, the second layer is decodable with just the first/second combined layer. Also, compared to the case of decoding the first layer only, the frame frequency is five times when decoding the first/second combined layer. Consequently, as illustrated in the drawing, when the frame frequency of the first layer only is 24 fps, the frame frequency of the first/second combined layer is 120 fps.

Likewise in this example, for each picture, layer identification information for identifying the layer containing the picture is added to the coded image data of each layer. In other words, layer identification information (temporal_id) is placed in the header part of the NAL unit (nal_unit) of each picture. In this example, "temporal_id=0" is assigned to pictures belonging to the first layer, and "temporal_id=1" is assigned to pictures belonging to the second layer.

FIG. 22(b) illustrates example syntax of the FPS descriptor (fps_descriptor) in the case in which hierarchical classification and image coding as illustrated in FIG. 22(a) is conducted. The 8-bit field "descriptor_tag" indicates the class of the descriptor, and herein indicates that the descriptor is the FPS descriptor. For example, the currently unused "0xf0" is allocated. The 8-bit field "descriptor_length" indicates the immediately following byte length.

The 8-bit field "base" expresses the frame frequency information of pictures in the lowest layer, or in other words the frame frequency information of the first layer. In this example, the value is "0x18" indicating 24. The 8-bit field "max" expresses layer number information indicating the number of the multiple layers. In this example, the value is "0x02" indicating 2. Also, inside the for loop, the multiples of the frame frequency in the combined layer up to each layer in the second layer and subsequent layers versus the frame frequency of the first layer are all stated. In this example, the value is "0x05" for the second layer, which states that the multiple is 5×.

Other Example 3

Figure 23:
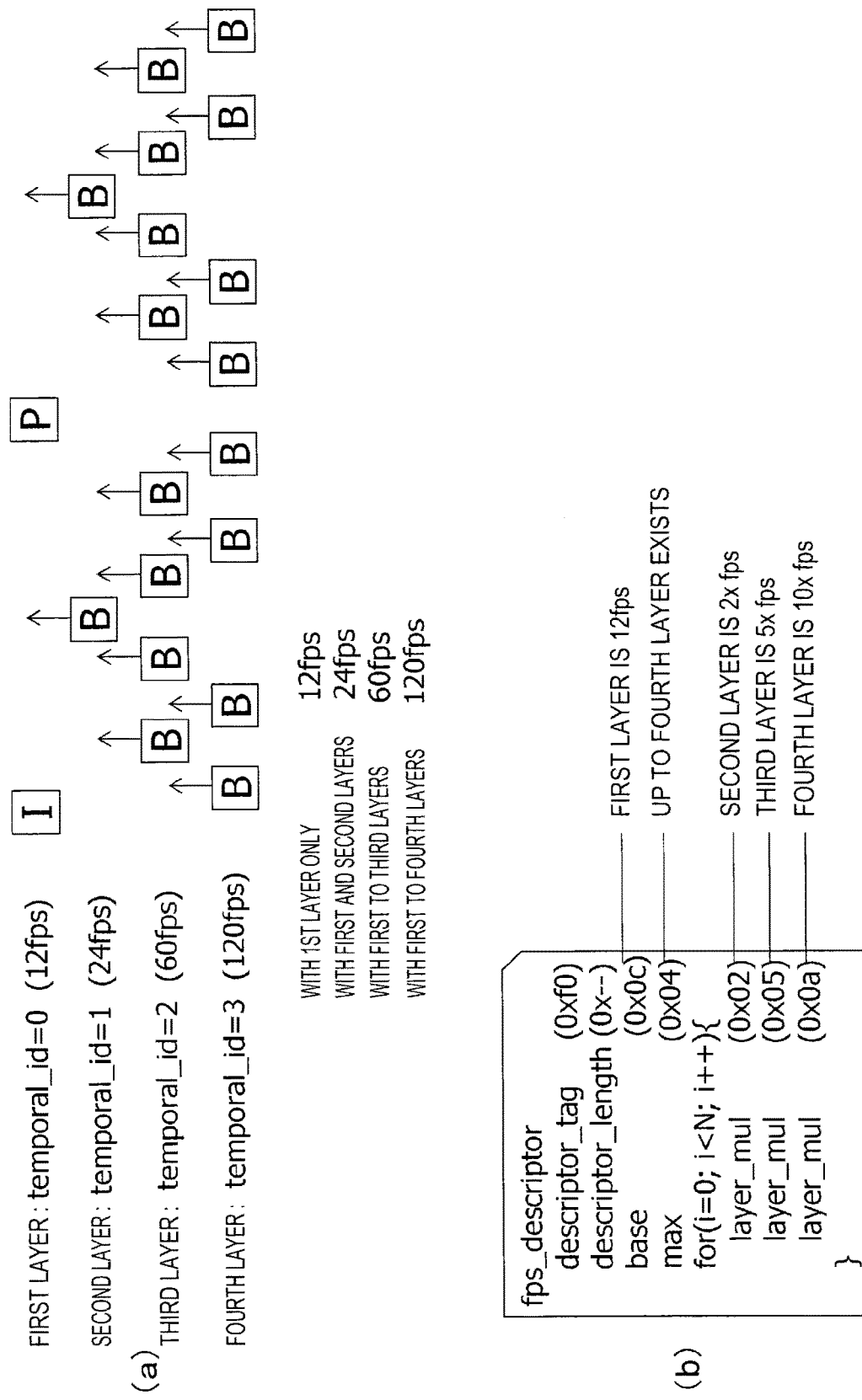
FIG. 23 is a diagram for explaining another example of hierarchical classification and image coding.

FIG. 23(a) also illustrates another example of hierarchical classification and image coding. This example is an example of classifying the image data of each picture into the four layers from the first layer to the fourth layer. In this example, I pictures and P pictures are made to belong to the first layer. An I picture does not reference another picture, while a P picture only references an I picture or a P picture. For this reason, the first layer is decodable with just first layer pictures.

In addition, B pictures (bi-directional predictive pictures) are placed in the temporal center positions between the respective pictures in the first layer, and are made to belong to the second layer. The B pictures in the second layer are encoded so as to reference only pictures belonging to a combined layer of the second layer and/or the first layer. For this reason, the second layer is decodable with just the first/second combined layer. Also, compared to the case of decoding the first layer only, the frame frequency is doubled when decoding the first/second combined layer. Consequently, as illustrated in the drawing, when the frame frequency of the first layer only is 12 fps, the frame frequency of the first/second combined layer is 24 fps.

In addition, four B pictures are placed at equal intervals temporally between each picture in the first layer, and are made to belong to the third layer. The B pictures in the third layer are encoded so as to only reference pictures belonging to the third layer and/or the second layer or below. For this reason, the third layer is decodable with from the first to third combined layers only. Also, compared to the case of decoding the first layer only, the frame frequency is five times when decoding from the first to third combined layers. Also, compared to the first and second combined layers, the frame frequency is 2.5 times. Consequently, as illustrated in the drawing, when the frame frequency of the first layer only is 12 fps, the frame frequency of the first to third combined layers is 60 fps.

In addition, B pictures (bi-directional predictive pictures) are placed in the temporal center positions between the respective pictures in the first layer and the third layer, and are made to belong to the fourth layer. However, a part of the pictures are missing, because they are the same as the pictures in the second layer. The B pictures in the fourth layer are encoded so as to only reference pictures belonging to the fourth layer and/or the third layer or below. For this reason, the fourth layer is decodable with the first to fourth combined layer only. Also, compared to the case of decoding the first layer only, the frame frequency is ten times when decoding from the first to fourth combined layers. Consequently, as illustrated in the drawing, when the frame frequency of the first layer only is 12 fps, the frame frequency of the first to second combined layers is 120 fps.

Likewise in this example, for each picture, layer identification information for identifying the layer containing the picture is added to the coded image data of each layer. In other words, layer identification information (temporal_id) is placed in the header part of the NAL unit (nal_unit) of each picture. In this example, "temporal_id=0" is assigned to pictures belonging to the first layer, "temporal_id=1" is assigned to pictures belonging to the second layer, "temporal_id=2" is assigned to pictures belonging to the third layer, and "temporal_id=3" is assigned to pictures belonging to the fourth layer.

FIG. 23(b) illustrates example syntax of the FPS descriptor (fps_descriptor) in the case in which hierarchical classification and image coding as illustrated in FIG. 23(a) is conducted. The 8-bit field "descriptor_tag" indicates the class of the descriptor, and herein indicates that the descriptor is the FPS descriptor. For example, the currently unused "0xf0" is allocated. The 8-bit field "descriptor_length" indicates the immediately following byte length.

The 8-bit field "base" expresses the frame frequency information of pictures in the lowest layer, or in other words the frame frequency information of the first layer. In this example, the value is "0x0C" indicating 12. The 8-bit field "max" expresses layer number information indicating the number of the multiple layers. In this example, the value is "0x04" indicating 4. Also, inside the for loop, the multiples of the frame frequency in the combined layer up to each layer in the second layer and subsequent layers versus the frame frequency of the first layer are all stated. In this example, the value is "0x03" for the second layer, which states that the multiple is 2×. In addition, the value is "0x05" for the third layer, which states that the multiple is 5×. Further, the value is "0x0a" for the fourth layer, which states that the multiple is 10×.

[Other]

Also, although the foregoing embodiments illustrate a TV transmitting/receiving system 10 made up of the TV transmitter 100 and the TV receiver 200, the configuration of a TV transmitting/receiving system to which the present technology is applicable is not limited thereto. For example, part of the TV receiver 200 may also be a configuration of a set-top box and a monitor or the like connected by a digital interface such as High-Definition Multimedia Interface (HDMI), for example.

Also, the foregoing embodiments illustrate an example in which the container is a transport stream (MPEG-2 TS). However, the present technology is similarly applicable to systems configured for delivery to a receiving terminal using a network such as the Internet. With Internet delivery, content is often delivered in a container for MP4 or some other format. In other words, for the container, containers of various formats, such as the transport stream (MPEG-2 TS) adopted in digital broadcasting standards, or MP4 being used for Internet delivery.

Additionally, the present technology may also be configured as below.

(1)
A transmitting device including:
a hierarchical classification section that classifies image data of each picture constituting moving image data into a plurality of layers;
an image coding section that codes the classified image data of each layer, and generates a video stream holding the coded image data of each layer; and
a transmitting section that transmits a container in a prescribed format that includes the generated video stream,
wherein the image coding section performs coding so that a referenced picture belongs to a layer of referencing image data and/or a layer lower than the layer of the referencing image data.

(2)
The transmitting device according to (1), wherein
the image coding section
generates a single video stream holding the coded image data of each layer, and
adds, for each picture, layer identification information for identifying the layer containing the picture to the coded image data of each layer.

(3)
The transmitting device according to (1) or (2), wherein
the hierarchical classification section classifies the image data of each picture constituting the moving image data into a plurality of layers so that, except for a lowest layer, pictures belonging to each layer are equal in number to pictures belonging to all lower layers, and in addition, are positioned in a temporal center between the pictures belonging to all lower layers.
(4)
The transmitting device according to any one of (1) to (3), further including:
an information inserting section that inserts, into the container, frame frequency information of pictures in a lowest layer and layer number information indicating the number of the plurality of layers.
(5)
The transmitting device according to (4), wherein
the information inserting section inserts the information into a container layer or a video layer.
(6)
The transmitting device according to (5), wherein
when inserting the information into the video layer, the information inserting section additionally inserts, into the container layer, identification information that identifies whether or not an insertion of the information into the video layer exists.
(7)
The transmitting device according to (1), wherein
the image coding section generates a plurality of video streams holding the coded image data for each of the plurality of layers.
(8)
The transmitting device according to (7), further including:
an identification information inserting section that inserts stream identification information for identifying the video stream of each layer into the container layer.
(9)
A transmitting method including:
a step that classifies image data of each picture constituting moving image data into a plurality of layers;
a step that codes the classified image data of each layer so that a referenced picture belongs to a layer of referencing image data and/or a layer lower than the layer of the referencing image data, and generates a video stream holding the coded image data of each layer; and
a step that transmits a container in a prescribed format that includes the generated video stream.
(10)
A transmitting device including:
a hierarchical classification section that classifies image data of each picture constituting moving image data into a plurality of layers;
an image coding section that codes the classified image data of each layer, and generates a video stream holding the coded image data of each layer; and
a transmitting section that transmits a container in a prescribed format that includes the generated video stream,
wherein the image coding section
generates a single video stream holding the coded image data of each layer, and
adds, for each picture, layer identification information for identifying the layer containing the picture to the coded image data of each layer.
(11)
A coding device including:
a hierarchical classification section that classifies image data of each picture constituting moving image data into a plurality of layers; and
an image coding section that codes the classified image data of each layer, and generates a video stream holding the coded image data of each layer,
wherein the image coding section performs coding so that a referenced picture belongs to a layer of referencing image data and/or a layer lower than the layer of the referencing image data.
(12)
The coding device according to claim 11,
wherein the image coding section
generates a single video stream holding the coded image data of each layer, and
adds, for each picture, layer identification information for identifying the layer containing the picture to the coded image data of each layer.
(13)
A receiving device including:
a receiving section that receives a container in a prescribed format that includes a video stream holding image data of each picture constituting moving image data, the image data being classified into a plurality of layers and coded so that a referenced picture belongs to a layer of referencing image data and/or a layer lower than the layer of the referencing image data;
an image decoding section that selectively retrieves and decodes coded image data of a prescribed layer and lower layers from the video stream included in the received container, and obtains image data of each picture; and
a playback speed adjustment section that adjusts a speed of image playback according to the decoded image data of each picture to match a frame frequency of pictures in the prescribed layer.
(14)
The receiving device according to (13), wherein
frame frequency information of pictures in a lowest layer and layer number information indicating the number of the plurality of layers are inserted into the container,
the receiving device further including:
a control section that, on the basis of the information inserted into the container and decoding performance of the receiving device, controls a decoding layer in the image decoding section, and controls the image playback speed in the playback speed adjustment section.
(15)
The receiving device according to (13), wherein
a single video stream holding the coded image data of each layer is included in the container,
for each picture, layer identification information for identifying the layer containing the picture is added to the coded image data of each layer, and
the image decoding section selectively retrieves and decodes coded image data in the prescribed layer and lower layers from the single video stream on the basis of the layer identification information.
(16)
The receiving device according to (13), wherein
a plurality of video streams holding the coded image data for each of the plurality of layers is included in the container,
stream identification information for identifying the video stream of each layer is inserted into the container layer, and
the image coding section selectively retrieves and decodes coded image data from the video streams of a prescribed layer and lower layers on the basis of the stream identification information.

(17)

A receiving method including:

a step that receives a container in a prescribed format that includes a video stream holding image data of each picture constituting moving image data, the image data being classified into a plurality of layers and coded so that a referenced picture belongs to a layer of referencing image data and/or a layer lower than the layer of the referencing image data;

a step that selectively retrieves and codes coded image data of a prescribed layer and lower layers from the video stream included in the received container, and obtains image data of each picture; and a step that adjusts a speed of image playback according to the decoded image data of each picture to a frame frequency of pictures in the prescribed layer.

(18)

A decoding device including:

an image decoding section that, from a video stream holding image data of each picture constituting moving image data, the image data being classified into a plurality of layers and coded so that a referenced picture belongs to a layer of referencing image data and/or a layer lower than the layer of the referencing image data, selectively retrieves and codes coded image data of a prescribed layer and lower layers, and obtains image data of each picture; and a playback speed adjustment section that adjusts a speed of image playback according to the decoded image data of each picture to a frame frequency of pictures in the prescribed layer.

A main feature of the present technology is that the image data of each picture constituting moving image data is classified into multiple layers, the image data of each layer is coded so that a referenced picture belongs to a layer of referencing image data or a lower layer than the layer of the referencing image data, and a video stream holding the coded image data of each layer is transmitted in a container of a predetermined format, thereby enabling a high frame frequency service to be achieved with ease.

REFERENCE SIGNS LIST

10 TV transmitting/receiving system
100 TV transmitter
101 original moving image data supply section
102 decoding device
103 hierarchical classification section
104 image coding section
105 audio coding section
106 multiplexing section
107 additional information producing section
108 modulation/transmitting antenna section
200 TV receiver
201 receiving antenna/demodulation section
202 demultiplexing section
203 control section
204 image decoding section
205 playback speed adjustment section
206 image display section
207 audio decoding section
208 audio output section

The invention claimed is:

1. A transmitting device comprising:
circuitry configured to:
classify image data of pictures constituting moving image data into a plurality of layers arranged in a hierarchical order, each picture belonging to any particular layer that is not a lowest layer of the plurality of layers having a temporal position in a temporal center between two temporally adjacent pictures belonging to a combination of any of the plurality of layers that are lower than the particular layer;
code the classified image data of each layer, including coding a picture of a layer using a referenced picture that belongs to the same layer or a lower layer;
generate a video stream holding the coded image data of each layer;
generate a container layer descriptor that includes
frame frequency information of pictures in the lowest layer,
layer number information indicating
a number of layers in the plurality of layers, and
for each layer higher than the lowest layer, a respective multiplication factor, a frame frequency corresponding to the layer being a frame frequency of the lowest layer multiplied by the respective multiplication factor;
generate a container in a prescribed format that includes the generated video stream and the generated container layer descriptor; and
transmit the generated container.

2. The transmitting device according to claim 1, wherein the circuitry is configured to:
generate a single video stream holding the coded image data of each layer, and
add, for each picture, layer identification information for identifying the layer containing the picture to the coded image data of each layer.

3. The transmitting device according to claim 1, wherein the circuitry is configured to generate a plurality of video streams holding the coded image data for each of the plurality of layers.

4. The transmitting device according to claim 3, wherein the circuitry is configured to insert stream identification information for identifying the video stream of each layer into the container layer descriptor.

5. A transmitting method comprising:
classifying image data of pictures constituting moving image data into a plurality of layers arranged in a hierarchical order, each picture belonging to any particular layer that is not a lowest layer of the plurality of layers having a temporal position in a temporal center between two temporally adjacent pictures belonging to a combination of any of the plurality of layers that are lower than the particular layer;
coding the classified image data of each layer, including coding a picture of a layer using a referenced picture that belongs to the same layer or a lower layer;
generating a video stream holding the coded image data of each layer;
generating a container layer descriptor that includes
frame frequency information of pictures in the lowest layer,
layer number information indicating a number of layers in the plurality of layers, and
for each layer higher than the lowest layer, a respective multiplication factor, a frame frequency corresponding to the layer being a frame frequency of the lowest layer multiplied by the respective multiplication factor;
generating a container in a prescribed format that includes the generated video stream and the generated container layer descriptor; and
transmitting the generated container.

6. A transmitting device comprising:
circuitry configured to:
  classify image data of pictures constituting moving image data into a plurality of layers arranged in a hierarchical order, each picture belonging to any particular layer that is not a lowest layer of the plurality of layers having a temporal position in a temporal center between two temporally adjacent pictures belonging to a combination of any of the plurality of layers that are lower than the particular layer;
  code the classified image data of each layer;
  generate a single video stream holding the coded image data of each layer;
  add, for each picture, layer identification information for identifying the layer containing the picture to the coded image data of each layer;
  generate a container layer descriptor that includes
    frame frequency information of pictures in the lowest layer,
    layer number information indicating a number of layers in the plurality of layers, and
    for each layer higher than the lowest layer, a respective multiplication factor, a frame frequency corresponding to the layer being a frame frequency of the lowest layer multiplied by the respective multiplication factor;
  generate a container in a prescribed format that includes the generated video stream and the generated container layer descriptor; and
  transmit the generated container.

7. A coding device comprising:
circuitry configured to:
  classify image data of pictures constituting moving image data into a plurality of layers arranged in a hierarchical order, each picture belonging to any particular layer that is not a lowest layer of the plurality of layers having a temporal position in a temporal center between two temporally adjacent pictures belonging to a combination of any of the plurality of layers that are lower than the particular layer;
  code the classified image data of each layer, including coding a picture of a layer using a referenced picture that belongs to the same layer or a lower layer;
  generate a video stream holding the coded image data of each layer;
  generate a transport stream layer descriptor that includes
    frame frequency information of pictures in the lowest layer,
    layer number information indicating a number of layers in the plurality of layers, and
    for each layer higher than the lowest layer, a respective multiplication factor, a frame frequency corresponding to the layer being a frame frequency of the lowest layer multiplied by the respective multiplication factor; and
  generate a transport stream in a prescribed format that includes the generated video stream and the generated transport stream layer descriptor.

8. The coding device according to claim 7, wherein the circuitry is further configured to:
generate a single video stream holding the coded image data of each layer, and
  add, for each picture, layer identification information for identifying the layer containing the picture to the coded image data of each layer.

9. A receiving device comprising:
circuitry configured to:
  receive a container in a prescribed format that includes a container layer descriptor and a video stream holding image data of pictures constituting moving image data, the image data being classified into a plurality of layers arranged in a hierarchical order and coded so that a picture of a layer is coded using a referenced picture that belongs to the same layer or a lower layer, and each picture belonging to any particular layer that is not a lowest layer of the plurality layers having a temporal position in a temporal center between two temporally adjacent pictures belonging to a combination of any of the plurality of layers that are lower than the particular layer;
  retrieve, from the container layer descriptor,
    frame frequency information of pictures in the lowest layer,
    layer number information indicating a number of layers in the plurality of layers, and
    for each layer higher than the lowest layer, a respective multiplication factor, a frame frequency corresponding to the layer being a frame frequency of the lowest layer multiplied by the respective multiplication factor;
  retrieve and decode coded image data of a selected layer, or the selected layer and any of the plurality of layers that are lower than the selected layer when the selected layer is not the lowest layer, from the video stream included in the received container to obtain decoded image data of pictures associated with the selected layer; and
  adjust a speed of image playback of the decoded image data according to a frame frequency associated with the selected layer that is determined based on the retrieved frame frequency information and a corresponding multiplication factor.

10. The receiving device according to claim 9, wherein the circuitry is configured to:
determine the selected layer on the basis of the frame frequency associated with the selected layer and decoding performance of the receiving device.

11. The receiving device according to claim 9, wherein
a single video stream holding the coded image data of each layer is included in the container,
for each picture, layer identification information for identifying the layer containing the picture is added to the coded image data of each layer, and
the circuitry is configured to retrieve and decode the coded image data of the selected layer, or the selected layer and any of the plurality of layers that are lower than the selected layer when the selected layer is not the lowest layer, from the single video stream on the basis of the layer identification information.

12. The receiving device according to claim 9, wherein
a plurality of video streams holding the coded image data for each of the plurality of layers is included in the container,
stream identification information for identifying the video stream of each layer is inserted into the container layer descriptor, and
the circuitry is configured to retrieve and decode the coded image data of the selected layer, or the selected layer and any of the plurality of layers that are lower than the selected layer when the selected layer is not the lowest layer, from the video streams on the basis of the stream identification information.

13. A receiving method comprising:
receiving a container in a prescribed format that includes a container layer descriptor and a video stream holding image data of pictures constituting moving image data, the image data being classified into a plurality of layers arranged in a hierarchical order and coded so that a picture of a layer is coded using a referenced picture that belongs to the same layer or a lower layer, and each picture belonging to any particular layer that is not a lowest layer of the plurality of layers having a temporal position in a temporal center between two temporally adjacent pictures belonging to a combination of any of the plurality of layers that are lower than the particular layer;
retrieving, from the container layer descriptor,
 frame frequency information of pictures in the lowest layer,
 layer number information indicating a number of layers in the plurality of layers, and
 for each layer higher than the lowest layer, a respective multiplication factor, a frame frequency corresponding to the layer being a frame frequency of the lowest layer multiplied by the respective multiplication factor;
retrieving and decoding coded image data of a selected layer, or the selected layer and any of the plurality of layers that are lower than the selected layer when the selected layer is not the lowest layer, from the video stream included in the received container to obtain decoded image data of pictures associated with the selected layer; and
adjusting a speed of image playback of the decoded image data according to a frame frequency associated with the selected layer that is determined based on the retrieved frame frequency information and a corresponding multiplication factor.

14. A decoding device comprising:
circuitry configured to:
 retrieve and decode coded image data of a selected layer of a plurality of layers, or the selected layer and any of the plurality of layers that are lower than the selected layer when the selected layer is not a lowest layer of the plurality of layers, from a video stream of a container to obtain decoded image data of pictures associated with the selected layer, the video stream holding image data of pictures constituting moving image data, the image data being classified into the plurality of layers arranged in a hierarchical order and coded so that a picture of a layer is coded using a referenced picture that belongs to the same layer or a lower layer, and each picture belonging to any particular layer that is not the lowest layer of the plurality of layers having a temporal position in a temporal center between two temporally adjacent pictures belonging to a combination of any of the plurality of layers that are lower than the particular layer;
 retrieve, from a container layer descriptor of the container,
  frame frequency information of pictures in the lowest layer,
  layer number information indicating a number of layers in the plurality of layers, and
  for each layer higher than the lowest layer, a respective multiplication factor, a frame frequency corresponding to the layer being a frame frequency of the lowest layer multiplied by the respective multiplication factor; and
 adjust a speed of image playback of the decoded image data according to a frame frequency associated with the selected layer that is determined based on the retrieved frame frequency information and a corresponding multiplication factor.

15. The receiving method according to claim 13, further comprising:
retrieving, from the container layer descriptor, stream identification information for identifying the video stream of each layer,
wherein the retrieving and decoding the coded image data of the selected layer is performed on the basis of the stream identification information.

* * * * *